US008686582B2

(12) United States Patent
Gardiner et al.

(10) Patent No.: US 8,686,582 B2
(45) Date of Patent: Apr. 1, 2014

(54) WAVE ENERGY CONVERTER

(75) Inventors: Alister Gardiner, Christchurch (NZ); Lan Le-Ngoc, Christchurch (NZ); Alan Caughley, Christchurch (NZ)

(73) Assignees: Industrial Research Limited, Lower Hutt (NZ); Power Projects Limited, Wellington (NZ)

( * ) Notice: Subject to any disclaimer, the term of this patent is extended or adjusted under 35 U.S.C. 154(b) by 665 days.

(21) Appl. No.: 12/515,864

(22) PCT Filed: Nov. 21, 2007

(86) PCT No.: PCT/NZ2007/000343
§ 371 (c)(1),
(2), (4) Date: Jan. 20, 2010

(87) PCT Pub. No.: WO2008/063086
PCT Pub. Date: May 29, 2008

(65) Prior Publication Data
US 2010/0140944 A1  Jun. 10, 2010

(30) Foreign Application Priority Data

Nov. 21, 2006 (NZ) .................................. 551485

(51) Int. Cl.
*F03B 13/12* (2006.01)
(52) U.S. Cl.
USPC .............................................. 290/53; 290/42
(58) Field of Classification Search
USPC ............. 290/53, 42, 43, 54; 60/398, 506, 500
See application file for complete search history.

(56) References Cited

U.S. PATENT DOCUMENTS 3,631,670 A    1/1972  Vassilakis
3,928,967 A   12/1975  Salter
(Continued)

FOREIGN PATENT DOCUMENTS

GB      2 425 154     10/2006
JP      11-187609      7/1999
(Continued)

OTHER PUBLICATIONS

Watabe, Tomiji et al, "Heave and Pitch Buoy (HPB), A Miniature Wave Energy Converter", Proceedings of the Twelfth (2002) International Offshore and Polar Engineering Conference, Kitakyushu, Japan, May 26-31, 2002, pp. 649-654.

(Continued)

*Primary Examiner* — Vanessa Girardi
(74) *Attorney, Agent, or Firm* — Dann, Dorfman, Herrell and Skillman, P.C.

(57) ABSTRACT

A wave energy converter (10) for extracting useful energy from wave motion. The converter (10) comprises an active float (12) that is arranged to float on the water, and being arranged to heave and surge in response to wave motion acting on the active float, and an elongate reactive body (14) that is arranged to be suspended in a substantially submerged state into the water and having sufficient surface area and length such that it pitches in response to wave motion-acting on the reactive body. The active float (12) and reactive body (14) are pivotably coupled for pivotable movement relative to each other about a single pivot axis (16) in response to heaving and surging of the active float and pitching of the reactive body. The converter also comprises a power output system that is driven by the pivotable movement about the pivot axis to capture the useful energy.

27 Claims, 20 Drawing Sheets

(56) References Cited

U.S. PATENT DOCUMENTS

| | | | |
|---|---|---|---|
| 4,355,511 A * | 10/1982 | Jones | 60/507 |
| 4,400,940 A | 8/1983 | Watabe | |
| 4,490,621 A | 12/1984 | Watabe | |
| 4,580,400 A | 4/1986 | Watabe | |
| 4,781,023 A | 11/1988 | Gordon | |
| 6,045,339 A | 4/2000 | Berg | |
| 6,857,266 B2 | 2/2005 | Dick | |
| 7,012,340 B2 | 3/2006 | Yi | |
| 7,245,041 B1 | 7/2007 | Olson | |
| 7,759,813 B2 * | 7/2010 | Fujisato | 290/53 |
| 2003/0091393 A1 | 5/2003 | Flory | |
| 2004/0163389 A1 | 8/2004 | Gerber | |
| 2008/0122225 A1 * | 5/2008 | Smith | 290/42 |
| 2008/0169653 A1 | 7/2008 | Olson | |
| 2009/0066085 A1 * | 3/2009 | Gray | 290/42 |
| 2009/0146429 A1 * | 6/2009 | Protter et al. | 290/53 |

FOREIGN PATENT DOCUMENTS

| | | |
|---|---|---|
| JP | 2000-154774 | 6/2000 |
| JP | 2006-226274 | 8/2006 |
| KR | 10-2005-0065475 | 6/2005 |
| WO | 89/05401 | 6/1989 |
| WO | 99/28622 | 6/1999 |
| WO | 00/17519 | 3/2000 |
| WO | 2004/088129 | 10/2004 |
| WO | 2006/058421 | 6/2006 |
| WO | 2006079812 | 8/2006 |

OTHER PUBLICATIONS

International Search Report dated May 9, 2008 of International Application No. PCT/NZ2007/000343.

Australian Patent Examination Report, Appln. No. 2007322458, Sep. 3, 2012, pp. 1-8.

* cited by examiner

WAVE ENERGY CONVERTER

FIELD OF THE INVENTION

The present invention relates to a wave energy converter. In particular, although not exclusively, the wave energy converter is capable of extracting useful energy, such as electrical energy for example, from wave motion in a body of liquid, such as but not necessarily the sea.

BACKGROUND TO THE INVENTION

Wave energy has been identified as one possible source of renewable energy. Various wave energy conversion devices have been proposed that aim to extract useful energy from wave motion in a body of liquid, such as the sea. Waves are created through the transfer of wind energy to the surface of bodies of water. Wave energy is propagated for long distances in deep water with minimal attenuation by interactive velocity and pressure fluctuations within the body of water. Fifty percent of the energy is propagated by pressure fluctuations and fifty percent by velocity fluctuations. A successful wave energy conversion device must maximise interaction with these energy vectors, which are continually changing over time intervals spanning from seconds to years. Known wave energy conversion devices generally fall into two categories, namely wavelength devices and point absorbers.

Wavelength devices physically span the waves from crest to crest to provide a floating reference for the wave displacement forces, and are therefore very large structures of at least 100 to 200 meters in length. It is difficult to design a cost effective device of this size which can respond to short term changes in wave characteristics, and so large devices tend to have low overall conversion efficiency. Point absorbers are smaller and potentially more adaptable to changing wave conditions and so can have higher practical efficiencies. They use some other form of reference, for example the ocean floor or the shoreline, or through sufficient inertia in one component of the system. There are many different types of point absorber, including oscillating water columns and heaving buoys.

Oscillating water column based devices typically utilise a vertical tube or chamber in which waves surge back and forth to drive air through a power conversion device such as an air-turbine.

Heaving buoy point absorbers usually operate in a vertical mode, often referred to as "heave", and typically utilise a surface float that rises and falls with passing waves and reacts against the seabed or the inertia of a connected component to extract useful energy. A common type of point absorber is known as a self-reacting heaving buoy system that utilises a heaving buoy which reacts against a drag plate suspended and submerged below the active wave energy region, or an internal inertial mass which is designed to resonate at the wave period. There are essentially the following three basic components to a self-reacting heaving buoy system: a heaving buoy floating on the surface of the sea, some form of reaction device suspended and submerged below the surface, and a load resistance or power take-off placed between them. Some power take-off techniques limit adaptability to wave conditions and defeat the inherent responsive benefits of point absorbers. Direct drive point absorbers minimise these limitations as the response characteristics of the device can be largely controlled by the power take-off loading applied to the device.

Variations of the basic self-reacting heaving buoy systems described above have also been proposed. For example, U.S. Pat. No. 6,857,266 describes a wave energy converter that extracts useful energy based on the relative movement between two devices, each device comprising a surface float and a submerged body. The relative movement of the two devices in response to a passing wave may be used to effect an energy transfer as the devices are connected by linkages that are typically arranged to operate as power take-offs, for example they may be hydraulic devices that are arranged to drive an electrical generator.

Another type of point absorber based design, known as a "heave and pitch buoy", is described in Japanese patent 3218462. The heave and pitch buoy is arranged to extract useful energy from heave motion and also from rotational horizontal motion, often referred to as "pitch", caused by the exponential reduction in energy with depth of waves. In particular, the passing waves excite the heave and pitch buoy to oscillate in two directions, namely vertically for heave motion and horizontally for pitch motion. More specifically, heave motion is created in the vertical direction by potential wave energy and pitch motion is created in the horizontal direction by kinetic wave energy. The heave and pitch buoy has two floats, a main float and a sub-float. Plates join the two floats together and a link arm connects them to a reference tower which is fixed to the seabed. The link arm is pivotally connected to the tower at one end and pivotally connected to the main float at the other end. The main float is arranged to extract wave energy via its heave and pitch motions. In particular, the main float is designed to resonate with the waves in the heave and the heave of the sub-float also causes the main float to pitch. The heave and pitch motions are detected by the relative rotary displacement at the two pivotal connections which are in turn coupled to two rotary vane pumps so that the motion can converted into oil-hydraulic power for an oil-motor to drive an electrical generator.

Another type of point absorber based design is proposed in U.S. Pat. No. 3,631,670. The device proposed comprises two floating bodies that are linked by a rocking rod. In operation, the two floats bob up and down in the water at different frequencies and this imparts a rocking motion on the rocking rod. The device also comprises a mechanism for converting the rocking motion of the rocking rod into rotary motion that can be used to drive an electric power generator.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved wave energy converter for extracting useful energy from wave motion in a body of liquid, or to at least provide the public with a useful choice.

SUMMARY OF THE INVENTION

In a first aspect, the present invention broadly consists in a wave energy converter for extracting useful energy from wave motion in a body of liquid comprising: an active float that is arranged to float substantially toward or on the surface of the liquid, and being arranged to heave and surge in response to wave motion acting on the active float; an elongate reactive body that is arranged to be suspended in a substantially submerged state into the liquid below the surface and having sufficient surface area and length extending into the liquid from the surface such that it pitches in response to wave motion acting on the reactive body, the active float and reactive body being pivotably coupled for pivotable movement relative to each other about a single pivot axis in response to heaving and surging of the active float and pitching of the reactive body caused by wave motion in the body of liquid; and a power output system that is operatively driven by the pivotable movement about the pivot axis to capture the useful energy.

Preferably, the active float is arranged to have a low to medium inertia in both the vertical and horizontal directions to enhance heave and surge movements respectively.

Preferably, the active float is shaped with one or more drag surfaces upon which the wave motion acts to enhance surge movements.

In one form, the active float is at least partially hydrofoil-shaped to create lift force to enhance heave and/or surge movements in response to wave motion acting on the active float. In another form, the active float comprises one or more hydrofoil-shaped components extending from the underside of the active float into a submerged state below the surface of the liquid, the hydrofoil-shaped component(s) having an orientation relative to the active float that is arranged to create lift force to enhance heave and/or surge movements of the active float as wave motion acts on the hydrofoil-shaped component(s).

Preferably, the active float has a specific gravity of less than one.

Preferably, the preceding claims wherein the active float has a buoyancy-to-weight ratio in the range of 1.5:1 to 10:1. More preferably, the active float comprises a buoyancy-to-weight ratio of 2:1 to 4:1.

Preferably, the active float is substantially elongate and being substantially defined by a width extending parallel to the pivot axis, a length extending perpendicularly to the pivot axis, and a depth that extends perpendicularly to the width and length of the active float.

In one form, the active float has a substantially uniform cross-sectional profile along its length. In another form, the active float has a non-uniform cross-sectional profile along its length.

Preferably, the active float is a substantially elongate component extending between a first end proximal to the reactive body and a second end distal to the reactive body, the cross-sectional area between the ends being defined peripherally by opposed top and bottom surfaces that are joined by opposed side surfaces, the top surface being arranged to face skyward and the bottom surface being arranged to face toward and into the liquid. More preferably, the first and/or second ends of the active float act as a drag surface upon which wave motion acts to create drag force to enhance surge movements of the active float.

Preferably, the reactive body is arranged to have a medium to high inertia in the vertical direction to minimize heave movements that are in-phase with the wave motion acting on the reactive body and low to medium rotational inertia about a horizontal axis that is parallel to the pivot axis to enhance pitch movements of the reactive body in response to wave motion acting on the reactive body.

In one form, the reactive body is at least partially hydrofoil-shaped such that substantially vertical wave motion acting on the reactive body creates a horizontal lift force on the reactive body to enhance pitch movements of the reactive body. In another form, the reactive body comprises one or more hydrofoil-shaped components upon which substantially vertical wave motion acts to create a horizontal lift force on the reactive body to enhance pitch movements of the reactive body.

Preferably, the reactive body is arranged to have a specific gravity of approximately one such that it has either neutral or slightly positive or slightly negative buoyancy relative to the body of liquid.

Preferably, the reactive body has a buoyancy-to-weight ratio in the range of 0.8:1 to 1.2:1. More preferably, the reactive body is arranged to have a buoyancy-to-weight ratio in the range of 0.9:1 to 1.1:1.

Preferably, the reactive body longitudinally extends between a top end at or toward which the active float is pivotably coupled and a bottom end, the reactive body having sufficient width perpendicular to its longitudinal axis along at least a portion of its length extending up from the bottom end so as to create a sufficiently large active surface area upon which wave motion acts to cause pitch movements of the reactive body. More preferably, the reactive body is substantially defined by a length extending between its top and bottom ends, a width that is perpendicular along the longitudinal axis between the top and bottom ends, and a depth that is perpendicular to the longitudinal axis and the width, wherein the length is larger than the width, and the width is larger than the depth, so as to form a substantially elongate substantially plate-like reactive body.

Preferably, the reactive body is arranged to have a center of mass that is closer to the bottom end than the center of buoyancy so as to ensure that the reactive body is orientated in an upright substantially vertical position with its top end extending skyward and the bottom end extending into the body of liquid.

Preferably, the center of mass of the reactive body is closer to the bottom end than the top end of the reactive body.

Preferably, the reactive body comprises a predetermined mass density distribution along its length between the top end and bottom end, the mass density being high with a specific gravity that is substantially greater than one along and toward the bottom end and the mass density being low with a specific gravity of substantially less than one along and toward the top end of the reactive body.

Preferably, the reactive body comprises high density material(s) or structure(s) at or toward its bottom end and low density material(s) or structure(s) at or toward its top end.

Preferably, the reactive body comprises one or more controllable floatation devices at or toward its top end, such that the floatation devices maybe controlled to increase or decrease buoyancy of the reactive body as required. More preferably, the controllable floatation device(s) comprises controllable trim tanks or air bags.

Preferably, the reactive body-to-active float weight ratio is in the range of 5:1 to 30:1. More preferably, the reactive body-to-active float weight ratio is in the range of 10:1 to 20:1.

Preferably, the reactive body comprises a main body from which two spaced-apart arms extend, the active float being pivotally coupled between the arms for pivotal movement about the single pivot axis relative to the arms in response to motions of the active float and/or reactive body caused by wave motion in the body of liquid, the arms being of sufficient length to enable the active float to fully rotate 360° about the pivot axis in response to substantial wave motion.

Preferably, the reactive body is slack moored with one or more mooring ropes, each mooring rope being secured at one end at or toward the bottom surface of the body of liquid and at the other end at or toward the bottom end of the reactive body or at the center of pitch of the reactive body. More preferably, the body of liquid is the sea and the one or more mooring ropes are secured at one end to the sea-bed and are fixed at the other end at or toward the bottom of the reactive body that extends into the sea.

In one form, the power output system is arranged to utilise the captured useful energy to pressurise or pump water.

In another form, the power output system is arranged to generate electrical energy from the useful energy captured from the pivotable movement between the active float and reactive body about the pivot axis, the power output system comprising an electrical generator having a rotational drive shaft input and the pivotal movement about the pivot axis being coupled to the rotational drive shaft by a coupling system to drive the electrical generator to produce electrical energy.

In one form, the coupling system of the power output system is arranged to directly couple the pivotal movement at the pivot axis to the rotational drive shaft of the electrical generator.

In another form, the coupling system of the power output system is arranged to indirectly couple the pivotable movement at the pivot axis to the rotational drive shaft of the electrical generator via a gearbox system, the gearbox system being arranged to convert the oscillatory pivotal movement having a higher force and lower speed into a lower force at higher speed for driving the electrical generator.

Preferably, the coupling system further comprises a rectifier system that is arranged to convert the oscillatory pivotable movement at the pivot axis into rotational movement in one constant direction for driving the electrical generator.

Preferably, the coupling system comprises any one or more of the following forms of coupling system forms: mechanical, hydraulic, and/or pneumatic.

Preferably, the power output system is arranged to actively control the torque loading on the pivot axis in accordance with forward prediction of wave motion in order to enhance the useful energy captured. More preferably, the power output system comprises an electrical generator having a rotational drive shaft input and the relative pivotable movement at the pivot axis is coupled to the rotational drive shaft by a coupling system to drive the electrical generator to produce electrical energy, the electrical generator being arranged to drive a load and the power output system comprising a control system that is arranged to actively control the load level in accordance with forward prediction of wave motion in order to optimise the electrical energy generated.

In one form, the active float is directly pivotally coupled at or toward one end to the reactive body.

In another form, the active float is indirectly pivotally coupled to the reactive body via a sub-frame that is connected at one end to the active float and pivotally coupled at the other to the reactive body. Preferably, the sub-frame is securely connected at or toward the middle of the active float relative to its length, the active float being pivotally coupled to the sub-frame for pivotal movement relative to the sub-frame such that the active float has two degrees of freedom in that it can pivot relative to the reactive body and pivot relative to the sub-frame to maximise surface contact of the active float with the liquid during wave motion in that the orientation of the active float can conform for maximum contact with the liquid during wave motion. More preferably, the sub-frame is securely and rigidly fixed to the active float such that the active float has one degree of freedom in that it can pivot relative to the reactive body.

Preferably, the wave energy converter further comprises one or more additional active floats that are pivotally coupled to the reactive body for pivotal movement about the single pivot axis in response to wave motion, the power output system being operatively driven by the relative pivotable movement between the active floats and reactive body to collectively capture the useful energy.

Preferably, the body of liquid is the sea or ocean.

In a second aspect, the present invention broadly consists in a wave energy converter for extracting useful energy from wave motion in a body of liquid comprising: an active float that is arranged to float substantially toward or on the surface of the body of liquid; a reactive body that is arranged to be suspended in a substantially submerged state below the surface, the reactive body having a main body from which two spaced-apart arms extend, the active float being pivotably coupled between the arms for pivotable movement about a single pivot axis relative to the arms in response to motion(s) of the active float and/or reactive body caused by wave motion in the body of liquid, the arms being of sufficient length to enable the active float to fully rotate about the pivot axis in response to substantial wave motion; and a power output system that is operatively driven by the pivotable movement about the pivot axis to capture the useful energy.

In a third aspect, the present invention broadly consists in a wave energy converter for extracting electrical energy from wave motion in a body of liquid comprising: an active float that is arranged to float substantially toward or on the surface of the liquid, and being arranged to heave and surge in response to wave motion acting on the active float; an elongate reactive body that is arranged to be suspended in a substantially submerged state into the liquid below the surface and having sufficient surface area and length extending into the liquid from the surface such that it pitches in response to wave motion acting on the reactive body, the active float and reactive body being pivotably coupled for pivotable movement relative to each other about a single pivot axis in response to heaving and surging of the active float and pitching of the reactive body caused by wave motion in the body of liquid; and a power output system that is operatively driven by the pivotable movement about the pivot axis to generate electrical energy.

In a fourth aspect, the present invention broadly consists in a wave energy converter for extracting electrical energy from wave motion in a body of liquid comprising: an active float that is arranged to float substantially toward or on the surface of the body of liquid;

a reactive body that is arranged to be suspended in a substantially submerged state below the surface, the reactive body having a main body from which two spaced-apart arms extend, the active float being pivotably coupled between the arms for pivotable movement about a single pivot axis relative to the arms in response to motion(s) of the active float and/or reactive body caused by wave motion in the body of liquid, the arms being of sufficient length to enable the active float to fully rotate about the pivot axis in response to substantial wave motion; and a power output system that is operatively driven by the pivotable movement about the pivot axis to generate electrical energy.

In a fifth aspect, the present invention broadly consists in a wave energy conversion system comprising multiple wave energy converters according to any one of the first-fourth aspects of the invention, each of the converters being linked into a single power output system that is arranged to collectively capture the useful energy. Preferably, the power output system is arranged to convert the useful energy into electrical energy.

The second-fifth aspects of the invention may comprise any one or more of the features of the first aspect of the invention.

In this specification and the accompanying claims, the term "heave", unless the context suggests otherwise, is intended to describe a particular form of movement of a body in response to wave motion excitation forces acting on the body, and in particular it is intended to cover up and down movements of the body in the liquid, such as sea water, that are substantially in the vertical direction and which are caused primarily by hydrostatic (buoyancy) and/or hydrodynamic forces.

In this specification and the accompanying claims, the term "surge", unless the context suggests otherwise, is intended to describe a particular form of movement of a body in response to wave motion excitation forces acting on the body, and in particular it is intended to cover back and forth movements of the body in the liquid, such as sea water, that are substantially in the horizontal direction and which are caused primarily by hydrodynamic forces.

In this specification and the accompanying claims, the term "pitch", unless the context suggests otherwise, is intended to describe a particular form of movement of a body in response to wave motion excitation forces acting on the body, and in particular it is intended to cover rotational movements of the body in the liquid, such as sea water, that about a center of pitch on the body and which are caused primarily by hydrodynamic forces.

In this specification and the accompanying claims, the term "elongate", in the context of describing a 3-dimensional body having a length, width and depth, is intended to mean the length of the body is greater than its width and depth.

In the specification and the accompanying claims, the phrase "lift force" in the context of the wave motion acting on a hydrofoil-shaped body is intended to mean the force that causes a movement of the body in any direction that does not correspond with the direction of the wave motion acting on the body, and may include movements up and down in the vertical direction, movements back and forth sideways in the horizontal direction, or any combination thereof.

In the specification and the accompanying claims, the phrase "drag force" in the context of the wave motion acting on a hydrofoil-shaped body is intended to mean the force that causes a movement of the body in the direction that corresponds with the direction of the wave motion acting on the body, and may include movements up and down in the vertical direction, movements back and forth sideways in the horizontal direction, or any combination thereof.

In this specification and the accompanying claims, the phrase "wave motion" is intended to cover all forms of motion caused by waves, swells, currents, tides in a body of liquid, such as the sea, that result in energy propagation by cyclic variations in water velocity and pressure.

In this specification and the accompanying claims, the phrase "low inertia" in the context of describing a solid body is intended to mean the solid body has an inertial response time when subjected to the wave excitation forces in the direction of interest which is fast compared with the period of the wave with which it interacts. Note that in the context of this definition, low inertia does not necessarily imply low mass.

In this specification and the accompanying claims, the phrase "medium inertia" in the context of describing a solid body is intended to mean the solid body has an inertial response time when subjected to the wave excitation forces in the direction of interest which is of the same order as the period of the wave with which it interacts. Note that in the context of this definition, medium inertia does not necessarily imply medium mass.

In this specification and the accompanying claims, the phrase "high inertia" in the context of describing a solid body is intended to mean the solid body has an inertial response time when subjected to the wave excitation forces in the direction of interest which is slow compared with the period of the wave with which it interacts. Note that in the context of this definition, high inertia does not necessarily imply high mass.

The term "comprising" as used in this specification and claims means "consisting at least in part". When interpreting each statement in this specification and claims that include the term "comprising", features other than that or those prefaced by the term may also be present. Related terms such as "comprise" and "comprises" are to be interpreted in the same manner.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Theory Underlying the Wave Energy Converter

Energy propagation by ocean waves is complex. Wave energy propagates through a medium because it is continually transferred very efficiently between two forms of energy. The forms are defined by the properties of the medium. For free surface waves in the ocean, the key property is the mass of the water. Energy in the moving water is alternately converted between varying kinetic energy (resulting from velocity variations and the water inertia) and varying potential energy (resulting from pressure variations and the water weight). An investigation of the physical conditions at any point beneath the surface shows that the water particles are subjected to rotating pressure and velocity differentials caused by the wave motion as shown for an idealised monochromatic wave in FIG. 1a, in which the following parameters are associated with the wave motion: v=velocity, p=pressure differential, and λ=wavelength.

The pressure fluctuation "vector" leads the velocity fluctuation "vector" by 90°, which forces the water to move in a circular path. This path is in the direction of wave travel, with the water moving directly forward on the crest and directly backward in the trough. It moves directly up on the midpoint of a rising wave and directly down on midpoint of the falling wave. In the following, "potential energy" and "kinetic energy" refer to the instantaneous energy state of a particle of water due to the passing wave. Because of the circular motion, when resolved on the horizontal and vertical axes the energy variations are sinusoidal and they peak 90° apart. In other words, when the potential energy is maximum on the horizontal axis, the kinetic energy is maximum on the vertical axis. Correspondingly, at this time the potential energy is zero on the horizontal axis, and the kinetic energy is zero on the vertical axis. These conditions repeat every cycle, typically 8-20 seconds. The relationships are summarised in table 1 below, in which "MSL" refers to the mean sea level.

TABLE 1

Relative phasing of the energy components in an ocean wave

| Energy Component | MSL rising wave (0 deg) | Wave peak (90 deg) | MSL falling wave (180 deg) | Wave trough (270 deg) |
|---|---|---|---|---|
| Kinetic vertical | Max. up | Zero | Max. down | Zero |
| Potential vertical | Zero | Max. up | Zero | Max. down |
| Kinetic horizontal | Zero | Max. forward | Zero | Max. back |
| Potential horizontal | Max. forward | Zero | Max. back | Zero |

Forces on an object immersed in this wave environment will be subjected to alternating forces which vary in intensity and time in different directions depending on the shape, volume and mass of the body, and if appropriately arranged, the bodies can be made to work against one another at a pivot or hinge to transfer energy from the wave.

Figure 1A:
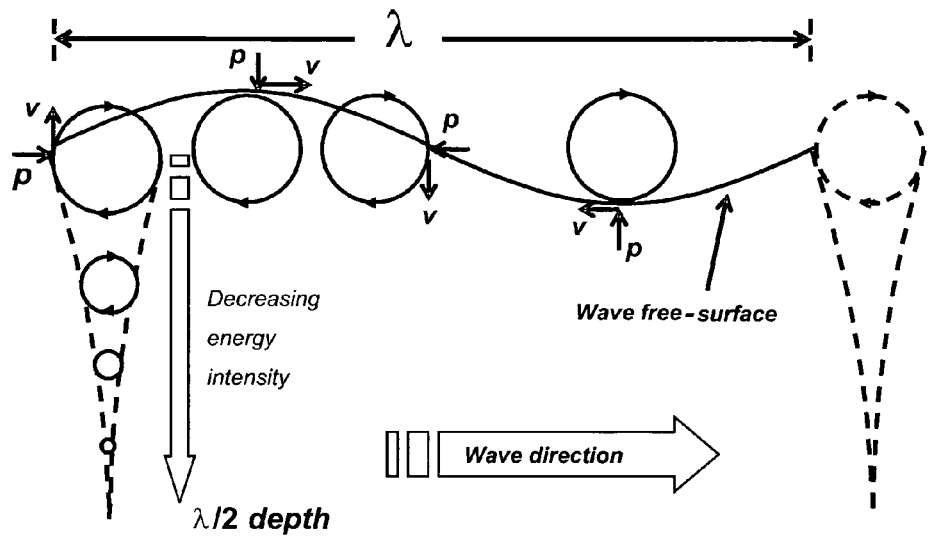
FIG. 1a shows an idealised water motion under a monochromatic free surface wave.

Referring to FIG. 1a, it can be seen that velocity (kinetic energy) and pressure (potential energy) fields exist in proportion to each other on each axis and both decrease together exponentially together with depth on the vertical axis such that both energy flows are negligible at a half wavelength depth. The potential energy does not tend to flow between the wave crest and trough as is conventionally thought. Energy fluctuations are present on the vertical axis but energy does not flow in this direction because the fluctuations are in phase. Energy flows in the horizontal direction as a result of the phase difference in this direction. However, from the viewpoint of an observer within the wave field there is little difference in the vertical or horizontal energy intensity.

Figure 1B:
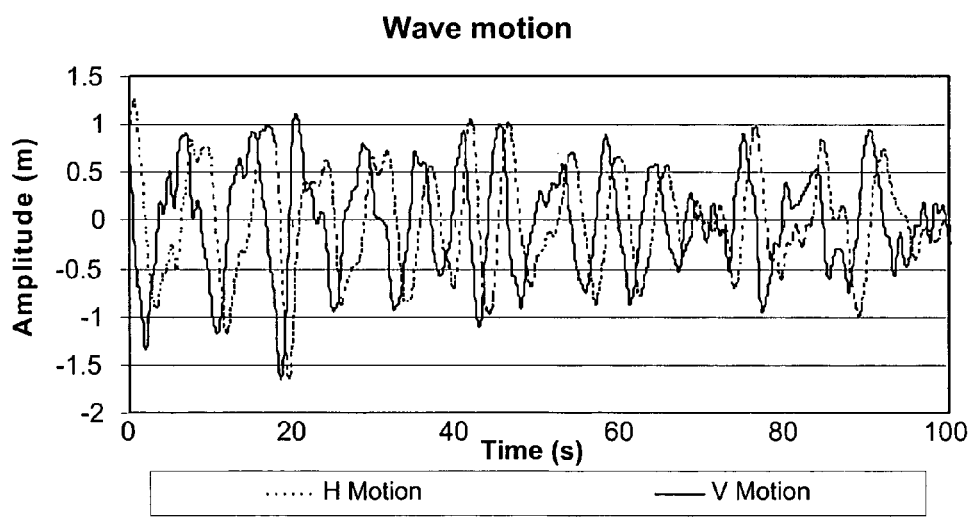
FIG. 1b shows a time graph of typical resolved horizontal and vertical wave motion in real seas.

FIG. 1b illustrates how water particle motion in real seas departs from the ideal. From the continuously varying particle velocity and acceleration it is clear that many more frequencies than the fundamental are present. However, the horizontal and vertical components are still basically 90° apart and there is a dominant frequency present.

General Topology of the Wave Energy Converter

The wave energy converter of the invention is a self-reacting point absorber that is arranged to extract useful energy from wave motion in a body of liquid. In particular, the wave energy converter is arranged to extract useful energy via its motions, such as surge, heave, pitch or any combination thereof, that are caused by passing waves. The general topology underlying the preferred form wave energy converter will now be described with reference to extracting useful energy from the sea or ocean in which wave motion may be provided in the form of waves, swells, currents, or any combination thereof. Later, first and second preferred embodiments of the wave energy converter will be described. It will be appreciated that the wave energy converter may also be arranged to operate in other bodies of liquid that have sufficient wave motion to excite the wave energy converter.

Figure 1C:
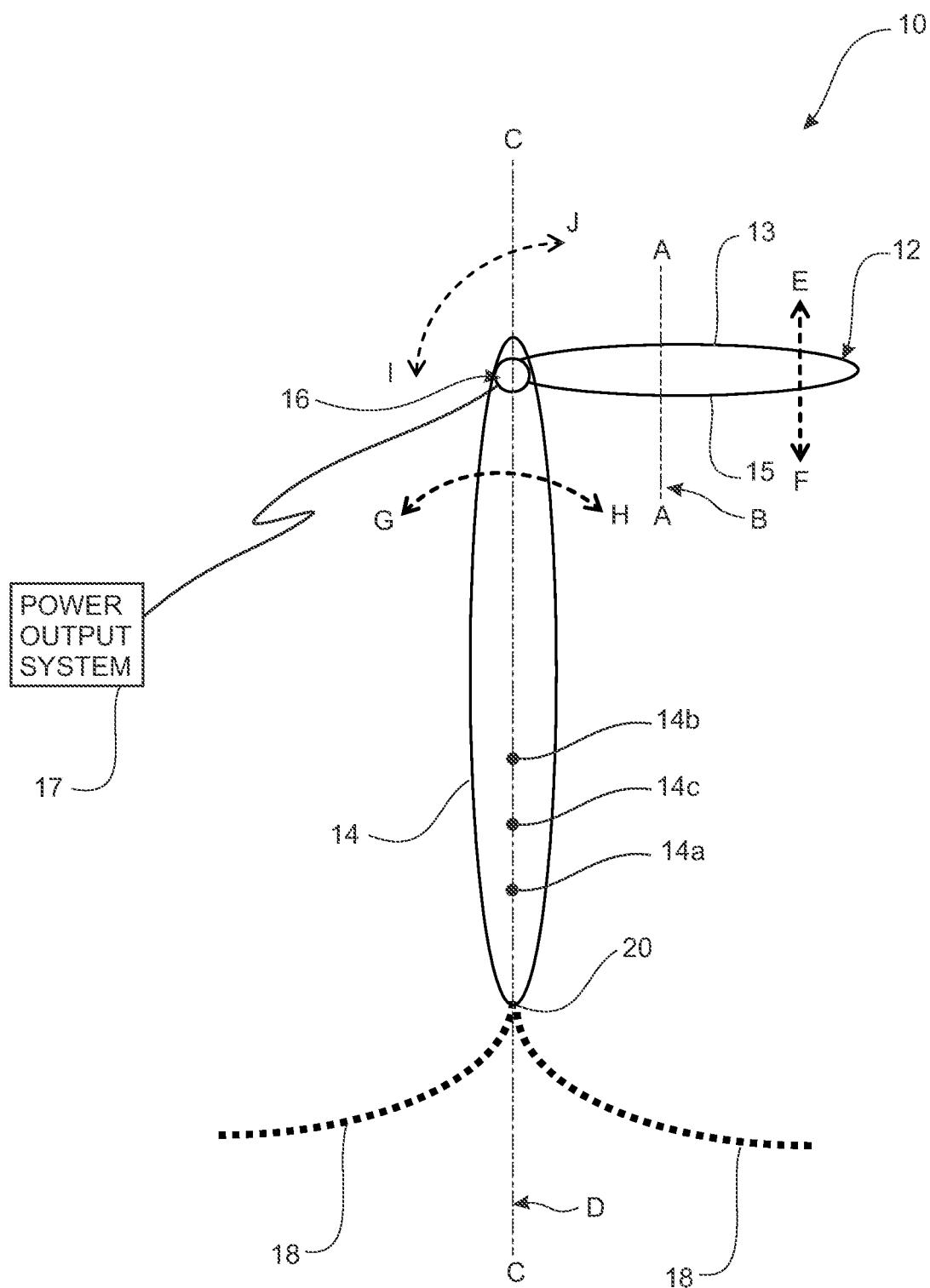
FIG. 1c shows a schematic diagram of a wave energy converter of the invention while resting in still water and utilising slack mooring cables attached at the bottom of a reactive body of the wave energy converter.

Referring to FIG. 1c, a schematic diagram of a preferred form of the wave energy converter 10 is shown. The main components of the wave energy converter 10 are an active float 12 and a reactive body 14 that are pivotably coupled for pivotable movement relative to each other about a pivot axis 16 in response to heave and/or pitch oscillations or motions of the float and body caused by passing waves, and a power output system 17 that is operatively driven by the pivotable movement about the pivot axis to generate useful energy, such as electrical energy. The shapes of the float and body as shown in FIG. 1c are simplified for clarity.

The wave energy converter 10 is arranged to undergo a wobbling or oscillating action perpendicular to the plane of the wavefront in response to surge and/or heave and/or pitch motions of the active float 12 and/or reactive body 14 caused by passing waves. In particular, the wave energy converter is designed to intercept two primary dimensions of near surface potential and kinetic energy wave flow via the heaving and surging action of the active float 12 and substantially the horizontal component of sub surface kinetic energy wave flow via the pitching action of the reactive body 14. FIG. 1*c* shows the wave energy converter 10 in a static or rest position. The active float 12 is arranged to float toward or on the surface of the sea at rest and arrows EF indicate the vertical movement of the active float about pivot axis 16 in response to wave motion and this vertical motion is known as heave. The active float 12 may also be arranged to surge back and forth along the surface of the sea as a result of the circular movement of water caused by wave motion. The reactive body 14 is arranged to float in a substantially submerged state below the surface of the sea and arrows GH indicate the predominant direction of substantially rotational movement of the reactive body in response to wave motion. This rotational motion is known as pitch. In this instance pitching of the vertical reactive body 14 is caused by the exponentially reducing hydrodynamic forces with depth, which results in a turning moment about the length of the body. The reactive body 14 may also float up and down in a vertical direction, and the phase of this motion may be controlled to extend the pivoting action about pivot axis 16. The power output system is operatively driven by the wobbling motion of the active float 12 and reactive body 14 and more specifically the relative pivotable movement or motion between them about the pivot axis 16, as indicated generally by arrows IJ, to generate, for example, electrical energy.

Active Float

As mentioned, the active float 12 is arranged to float on or near the surface of the sea and is designed to be lighter than the displaced body of liquid, for example sea water, so that it is buoyant. In particular, the active float 12 is a substantially elongate body and it is arranged to float in still water approximately horizontally on or toward the surface of the sea. In the preferred form, the active float 12 is arranged to have low or medium inertia in the vertical and horizontal directions so that it may respond to wave forces rapidly in any direction about the pivot point. By way of example, the active float 12 preferably has an SG<1, where SG is specific gravity. The active float 12 may also preferably have a hydrodynamic shape so that it can achieve vertical lift forces from surge (horizontal) water motion and horizontal lift forces from heave (vertical) water motion. By way of example, the active float 12 may also be shaped with drag fins or hydrofoil surfaces to encourage horizontal motion (surge) as this may enhance the pivotable movement about the pivot axis 16 caused by the vertical heave motion caused by passing Waves. In summary, the active float 12 is the member of the wave energy converter 10 to which wave energy forces primarily impart movement against a load torque applied about the pivot axis 16, thus involving it in doing work against the wave forces, either buoyancy (pressure) or hydrodynamic (velocity) induced. Work done on the active float 12 by the wave forces is represented by force times distance in the direction of the force. If this product is negative, the active float 12 does work on the wave or surrounding water by extracting energy from the power output system, which may alternatively be called the power take off system. This is a possible mode of operation over parts of the cycle to position the float 12 for optimum energy extraction.

Active Float—Torque Induced by Buoyancy, Weight and Drag

Figure 4:
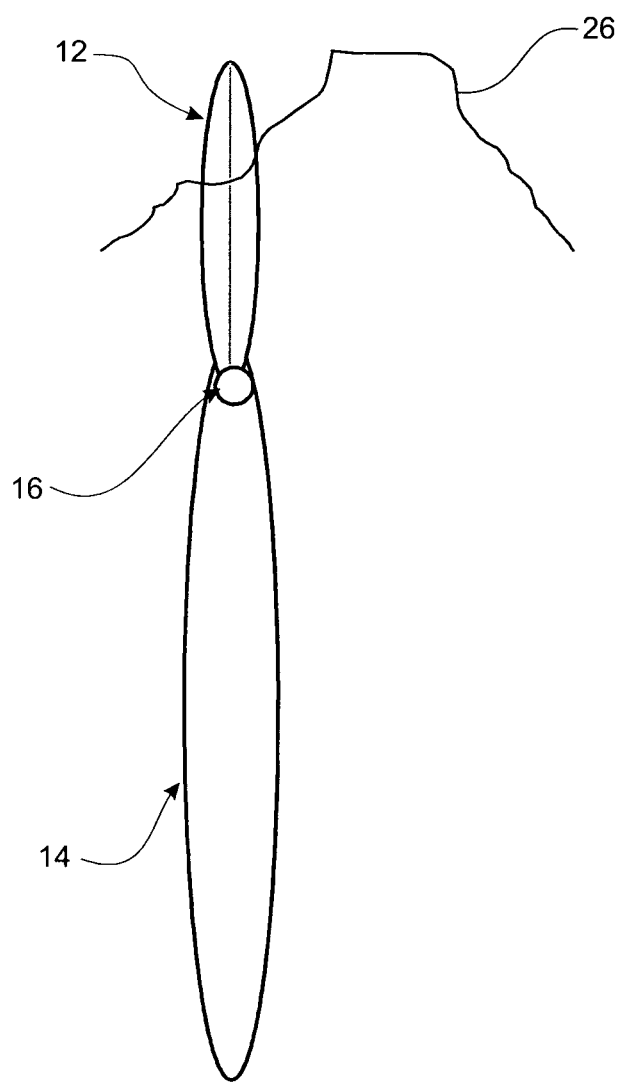
FIG. 4 shows a schematic diagram of the wave energy converter of FIG. 1c in storm survival mode.
Figure 4A:
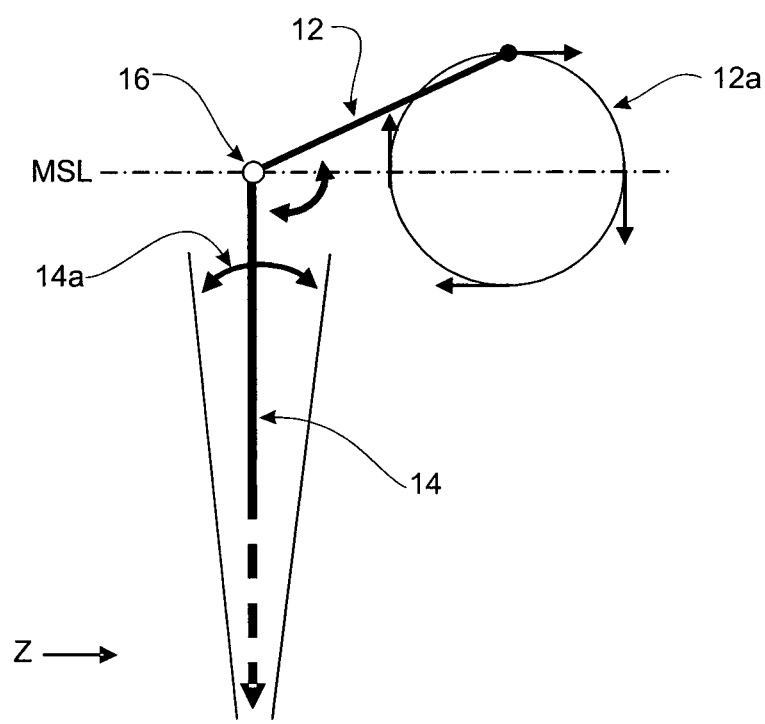
FIG. 4a shows a schematic diagram of the basic motions described by the active float and reactive body when subjected to idealised wave motion, the active float and reactive body being shown in positions corresponding to a wave peak.

Referring to FIG. 4*a*, the light weight active float 12 tends to follow wave motion which is basically circular. This tends to deliver oscillating torque about pivot axis 16. Depending on requirements, the preferred form active float 12 is arranged to be forced by the waves to heave (vertical motion) through buoyancy (up) and weight (down) forces and/or surge (horizontal motion) back and forth through drag forces such that it moves in a circular motion at the unattached end in phase with the wave motion of the water and is capable of transferring torque resulting from these forces to the pivot point. The ratio between buoyancy, gravity, and drag forces can be changed by adjustment of volume, mass, and shape of the active float 12 to achieve optimum results for any typical wave regime. Shape greatly affects drag forces and these can be enhanced in the horizontal direction over buoyancy by increasing the horizontal section exposed to the Water without increasing overall internal volume of the float for example by the addition of vertical plates to the bottom of the float, or elongating the float in the vertical direction.

Active Float—Torque Induced by Hydrofoil Lift

Hydrofoil shapes when resisted in the direction of motion of a fluid passing around the shape can efficiently induce lift forces at an angle to the relative motion. Therefore, the preferred form active float 12 may additionally be hydrofoil-shaped or comprise one or more hydrofoil-shaped components extending from its underside into the water and which are arranged to be fully under the water for an appropriate part of the cycle to enhance the net torque about the pivot axis 16. In particular, the hydrodynamic shape(s) are forced to move at an angle to the direction of water motion by the nature of hydrodynamic forces acting on the hydrofoil shape(s) when movement in the direction of water flow is resisted by loading at the pivot axis 16. Because of the circular motion of the waves, the hydrofoil shape(s) can be angled to achieve net hydrofoil induced forces about the pivot axis 16 in any desired direction such that overall net torque is added about the pivot axis when it is loaded or movement is resisted. The hydrofoil shape(s) provide drag force induced torque instead of lift induced force about the pivot axis 16 when resisted for other parts of the wave cycle and hence can replace other drag inducing shapes to the buoyant part of the active float 12, if desired.

Figure 2:
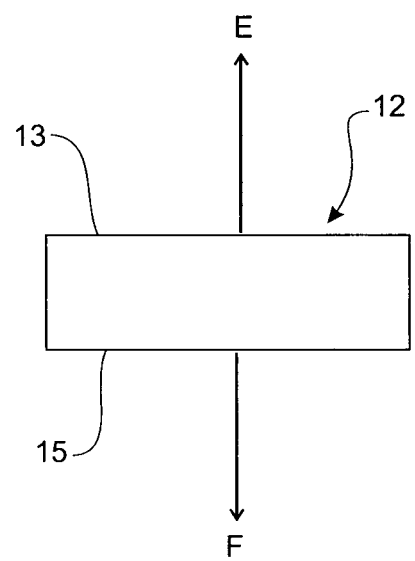
FIG. 2 shows a cross-sectional view of an active float of the wave energy converter through line AA from direction B of FIG. 1c.
Figure 2A:
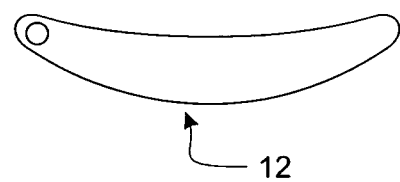
FIGS. 2a-2c show alternative hydrodynamically shaped forms of the active float of the wave energy converter from the same view as FIG. 1c.
Figure 2B:
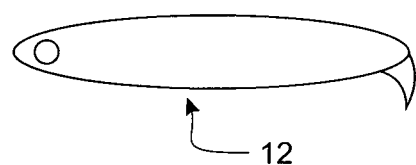
Figure 2C:
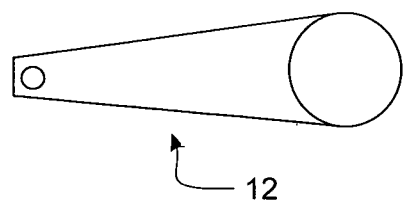

By way of example, FIGS. 1*c* and 2 show a preferred form of active float 12. The active float may preferably have a substantially hydrodynamic shape with curved or arcuate top 13 and bottom 15 surfaces, as shown in FIG. 2*a*. This hydrodynamic shape creates forces when the active float 12 is on top of the seawater during initial upward movement in direction E. In contrast, when the active float 12 is under the surface of the seawater for part of the cycle, the hydrodynamic shape creates a hydrofoil lift force and this in combination with the buoyancy of the float forces it downward in direction F. A hydrodynamic shape can enhance energy extraction by creating lift forces in various directions over different parts of the cycle. FIGS. 2*b*-2*c* show other possible alternative hydrodynamically shaped forms of the active float 12.

Active Float—Mass, Responsiveness and Fast Power Take Off Control at the Pivot Axis As mentioned, buoyancy, gravity, drag and hydrofoil induced forces all act to increase the torque induced about the pivot axis 16 by the active float 12 when it is loaded or resisted, as occurs when power is taken off the pivot axis. The preferred form active float 12 is light weight or low mass such that it can respond or accelerate rapidly with respect to the wave induced water motion and stay substantially in phase with the water motion if desired as when the pivot axis is unloaded. Its motion relative to the water is largely controlled by varying the torque loading according to fast active control of power taken off from the pivot axis 16, as will be described later. When pivot axis 16 is unloaded, no power is extracted and the active float 12 most closely follows the local water motion. Increasing the torque loading by increasing the power take off results in a lagging motion which eventually causes stall as the wave motion forces are insufficient to overcome the resisting torque and power output drops to zero as the pivot shaft or axis effectively becomes locked. As will be described later, for any wave condition there is an optimum dynamic loading condition which can extract maximum power from the pivot axis or shaft.

Reactive Body

The reactive body 14, which can also be called a platform or spar, is arranged to float in a substantially submerged state below the surface of the sea and is designed to have a mass that is of neutral, slightly positive, or slightly negative, buoyancy relative to the body of liquid, for example seawater. Where its buoyancy is negative, it is held suspended with its pivot point 16 near the surface by the buoyancy of the active float 12. In the preferred form, the reactive body 14 is arranged to have medium or high inertia in the vertical direction, for example it preferably has a small horizontal cross section at the water-air intersection to reduce vertical translation (heave movements). It is also arranged to have low or medium rotational inertia in the horizontal direction to encourage pitch, or rotation (for example it has substantial surface area in the direction facing the wave propagation). By way of example, the reactive body 14 preferably has an SG~1. The reactive body 14 is preferably an elongate body that is arranged to have a center of mass 14a below its center of buoyancy 14b, so that it tends to remain upright in a substantially vertical position. The center of rotation 14c of the pitch or pitching point of the reactive body is located between the center of mass 14a and center of buoyancy 14b. In the preferred form, the lower end of the reactive body 14 may be slack moored to the seabed by cables or chains 18 so as to stabilise the mooring point and enhance its pitch through the path of motion GH of FIG. 1c by stabilising the lower end of the body. In particular, the reactive body 14 will tend to pitch about the mooring point 20 as it preferably has a relatively low inertia in the rotational horizontal or pitching direction that does not inhibit pitching. This is achieved by distributing the density of the reactive body 14 such that its mass is concentrated about the desired pitching point. It will be appreciated that mooring is not essential to the wave energy converter, although in practice the mooring characteristic stabilises the device and potentially increases the magnitude of relative pivotable movement between the active float 12 and reactive body 14 about the pivot axis 16, and therefore enhances the useful energy extracted from the wave motion.

Figure 3:
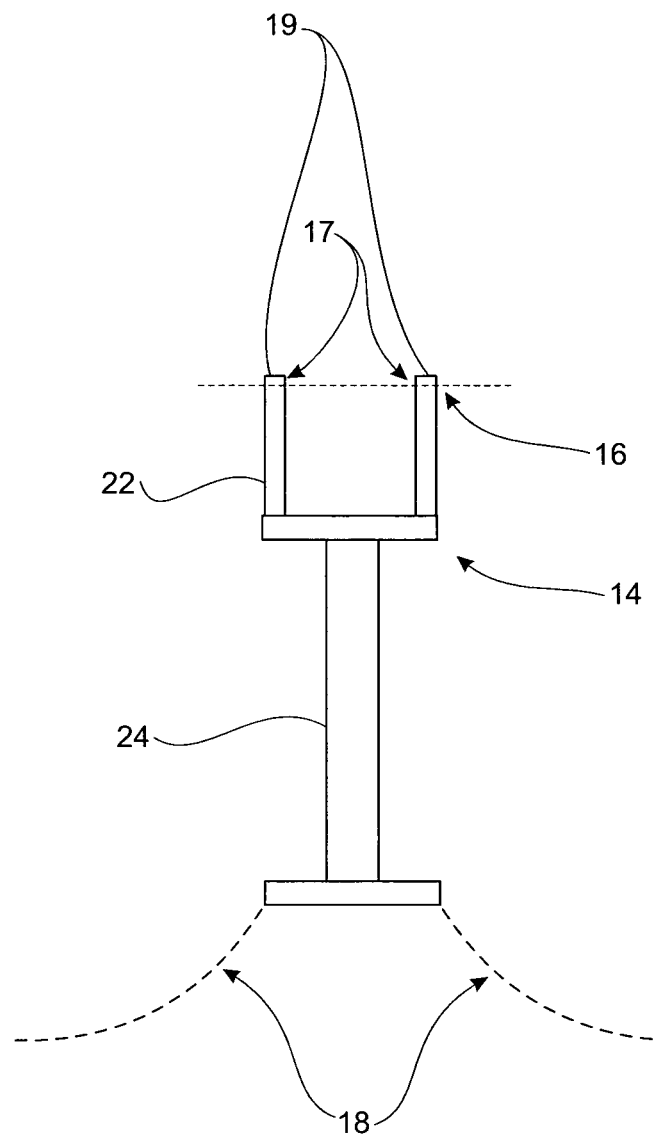
FIG. 3 shows a cross-sectional view of the reactive body of the wave energy converter through line CC from direction D of FIG. 1c.
Figure 3A:
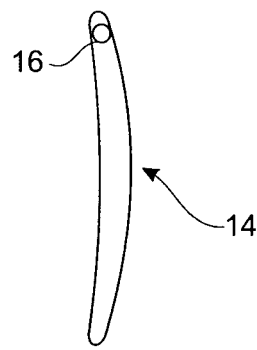
FIGS. 3a-3c show alternative hydrodynamically shaped forms of the reactive body of the wave energy converter from the same view as FIG. 1c, with the reactive bodies of FIGS. 3b and 3c having semicircular drag plate stabilisers.
Figure 3B:
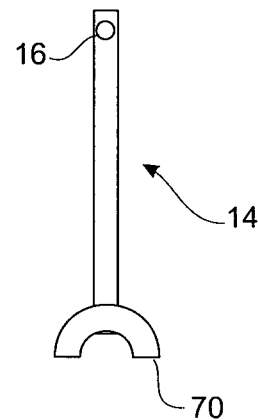
Figure 3C:
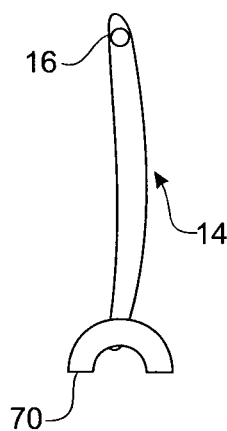

FIGS. 3a-3c show other possible alternative hydrodynamically shaped forms of the reactive body 14. Further, an alternative or additional method of stabilising the device in the vertical direction is to introduce drag plates 70 located about the pitch center, as shown in FIGS. 3b and 3c, such that they resist vertical movement of the reactive body 14 but not pitching motion. In summary, the reactive body 14 is the reference platform or heavier part of the wave energy converter 10 which is used to provide the reaction force so that energy (force times distance or torque times relative angular displacement between the active float and reactive body) can be absorbed by the wave energy converter. It may contain the heavier components such as the power output system, including the electrical generator, control gear, and other auxiliary systems.

As mentioned, the reactive body 14 is preferably designed to resist movement vertically, and can be stabilized in this direction in a number of ways, for example by having high inertia in the vertical direction, by drag masses or plates at the appropriate position, via the weight and drag of moorings, or any combination thereof. Furthermore, the reactive body 14 can be designed to operate in a damped antiphase or out of phase response at the predominant wave frequency, hence tending to pull the pivot point 16 down when the active float 12 is rising, and allowing it to rise when the active float is falling. This accentuates the angular movement about the pivot axis 16.

As mentioned, the reactive body 14 is designed and shaped to respond to pitching forces to further increase the relative motion between the active float 12 and the reactive body 14 and thereby the power output at the pivot axis 16. It will be appreciated that the shape, mooring, and distribution of mass of the reactive body 14 can be adjusted to encourage pitching action about its bottom end through the path indicated by arrows GH of FIG. 1c. In particular, pitching may be encouraged by, for example, concentrating the mass and/or drag plates at some point near the bottom (to encourage rotational inertia), also mooring from near the bottom, and creating drag surfaces on the upper part of the body to promote cyclic horizontal drag at the top of the reactive body.

By way of example, FIG. 3 shows the cross-sectional profile of a preferred form of reactive body 14. The preferred form of reactive body 14 preferably comprises two interconnected components, namely a frame 22 at the top of the body to locate the pivot axis 16 and a mass component 24 connected or suspended below to promote pitching by interaction with horizontal wave motion. The pivot axis 16 is shown at the top end of the frame 22 of the reactive body 14. It will be appreciated that the length of the reactive body 14 may be varied. Further, additional drag surfaces may be provided near the top of the reactive body 14 to promote pitching as wave motion around the bottom end of the vertical body is reasonably small compared to the wave motion at the surface of the sea. In the preferred form, the overall effective mass of the reactive body 14, including the mass of the mooring cables 18, drag and tension is high, to adequately resist motion in the vertical direction. In particular, the reactive body 14 is preferably arranged to move vertically out of phase, for example in anti-phase, with the wave motion to increase the relative pivotable movement between the bodies 12,14 and the resulting power output.

Reactive Body—Design of the Reactive Body to Induce Pitch Motion

The preferred form reactive body 14 has a somewhat conventional spar buoy design for movement in the vertical direction (heave response) but its horizontal cross section is designed to intercept wave pitching forces and transfer these into oscillating torque about the pivot axis 16 and the mass distribution of the reactive body is also adjusted to provide maximum responsiveness to wave energy in pitch, i.e. the exponential decay of wave energy with depth. Capture and conversion of pitch energy is achieved as follows. The area of the reactive body section facing the wave direction is large compared to the area of the body perpendicular to the wave direction, i.e. the horizontal cross section is elongated as in a plate-like component such that it has a sufficiently large active surface area for intercepting the wave horizontal forces. Because the reactive body extends to a depth where wave energy (and forces) are low, there is a strong tendency to pitch about some lower point due to the resultant force moment set up on the reactive body. The mass of the reactive body is concentrated about this pitch point so that its rotational inertia is low enough for it to accelerate rapidly enough to the pitch forces not to have significant phase lag when unloaded at the pivot axis 16. The location and concentration of this mass however has minimal effect on heave response since heave response relies on linear not rotational inertia.

Hence these two responses can be relatively decoupled, and separately designed. Basically the heave response must be small or out of phase with wave motion (low vertical acceleration achieved by low net vertical force due to, low intercept area+high mass relative to force) and the pitch response must be large (high angular acceleration achieved by high net horizontal force above centre of mass on high intercept area+low rotational inertia relative to force). Preferably, but not necessarily, mooring about the bottom or centre of pitch motion and inclusion of a shaped drag plate may be utilised to assist the vertical stability (suppressing heave) without significantly suppressing the pitch response. Pitch energy from the wave field can therefore be transferred to the reactive body 14 such that it is available as additive torque at the pivot axis 16.

The reactive body 14 may additionally, if desired, have a hydrofoil shape or be fitted with one or more hydrofoil-shaped components to assist stability and maintaining the reactive body in the correct upright orientation while also achieving increased useful power output. Under large waves when the active float 12 is loaded on rising waves, high torque is available from the pivot axis or shaft due to strong buoyancy forces. On falling waves, forces on the pivot shaft due to active float 12 weight and added mass of the water are not as large, leading to possible unbalancing and tilting of the reactive body 14 back towards the oncoming waves, reducing operating efficiency. Therefore, use of a vertical hydrofoil-shaped reactive body 14, for example as shown in FIG. 3a, provides a net horizontal lift force due to vertical water flow acting against the substantially stationary hydrofoil shape. The net effect of this horizontal force increases with wave height and thus acts to stabilise the vertical orientation of the reactive body 14 under all wave heights.

Interaction Between the Active Float and Reactive Body

It can be seen from FIG. 4a that if the pivot axis 16 is stationary in the water with the reactive body 14 vertical and the active float 12 extended horizontally in the rest position (approximately at right angles) only the resolved component of forces acting on the active float 12 tangential to the pivot transfer, torque power to the pivot shaft. This means that under small wave action surge (horizontal) forces acting on the active float 12 have little effect in transferring power. Surge forces on the active float 12 will however have some effect when the active float is at other than a right angle but for small extension angles (of the order of 20° or less the added tangential force and therefore power captured is typically minor). However, as the reactive body 14 is designed to pitch forward as the active float 12 rises both pitching of the reactive body 14 and surging of the active float 12 in response to wave motion allow additional torque and extension (increasing the included angle or opening of the hinge or pivot formed between the two bodies 12,14 which at rest or in neutral position is approximately at right angles) to be applied to the pivot 16. The same effect occurs in reverse on the falling side of the wave as the included angle reduces from a right angle, (i.e. the hinge or pivot formed between the two bodies 12,14 closes).

The two bodies 12,14 interact as described above and the combined mechanical energy is recovered from the single pivot 16 shaft for useful purpose to for example drive an electricity generator or pump. Because the system is closely coupled each body 12,14 affects the other and the surrounding wave fields and there is a constantly varying optimum pivot shaft power loading condition which maximises the power removed from the waves. As will be described, the control system of the wave energy converter continually adjusts the power take off to maintain this point through a maximum power point tracking algorithm and monitoring of the sea conditions. The active float 12 is light and responsive enough to track all typical wave periods from approximately 6 seconds upwards.

Construction Materials for Active Float and Reactive Body

It will be appreciated that the active float 12 and reactive body 14 can be formed from a range of different materials. The active float 12, which is required to be responsive and float with a SG significantly less than 1 can be manufactured from materials such as a corrosion protected steel shell with light weight filling material such as polystyrene foam or air. It is well known that polymer materials such as polyethylene or resin-fibre composites are robust in the marine environment and these are also suitable for the shell of the active float, with suitable additional mass added internally in the form of water or concrete for example. For the more massive reactive body 14, appropriately distributed mass is required delivering an overall SG of approximately 1. This can be achieved by use of combinations of low cost dense materials such as reinforced concrete and steel caissons, with low density materials such as closed cell foamed polymers or air tanks within the structure. Floatation and trimming adjustment may be achieved through relatively small controllable floatation devices, such as internal air-water or trim tanks for example.

Pivotable Coupling Between Active Float and Reactive Body

As mentioned, the active float 12 and reactive body 14 are pivotably coupled together to allow for pivotable movement relative to each other about a pivot axis 16 or pivot shaft. It will be appreciated that the bodies 12,14 may be pivotably coupled in various ways, including via a single pivotable connection or multiple pivotable connections about a single axis. Various hinging or pivotable mechanisms are known that could be utilised to pivotably couple the active float 12 to the reactive body 14. A preferred configuration is shown in FIG. 3, where the active float 12 may be securely located by bearings 17 located on posts 19 fixed on each side of the main reactive body 14. A feature of this configuration is that the active float is free to fully rotate about the pivot axis, making it highly survivable in storm and freak wave conditions, since no limits or restrictions are required on rotational movement.

Power Output System of Wave Energy Converter

The power output system 17 of the wave energy converter 10 is operatively driven by the relative pivotable movement between the active float 12 and reactive body 14 about the pivot axis 16 to generate electrical energy. By way of example only, a single wave energy converter 10 may be arranged to generate an output of up to a Megawatt, but it will be appreciated that smaller capacity modules of lesser output, for example 100 kW, could also be designed. The power output capacity can be altered to suit wave conditions and power demand. The power output system preferably comprises an electrical generator having a rotational drive shaft input that may be directly or indirectly driven by the pivotable movement between the bodies 12,14 about the pivot axis 16 to generate electricity. It will be appreciated that various coupling systems or power take-offs could be utilised to transfer the pivotable movement between the bodies 12,14 to the electrical generator drive shaft input, whether mechanical, hydraulic, pneumatic or any combination thereof. Further, the coupling system may transfer the pivotable movement to the electrical generator directly or indirectly via a gearbox or speed/torque converter (gearbox system) for converting the oscillatory pivotal movement at the pivot axis 16, which has a higher force and lower speed, into a lower force at higher speed for driving the electrical generator. In the preferred form, the primary shaft (pivot axis or point 16 between active float 12 and reactive body 14) is "hard-coupled" to the electrical generator, so that the torque load on this shaft may be instantaneously and accurately controlled by managing the power flow to (and possibly from) the electricity supply system. It will be appreciated that this requires the shaft to continually reverse direction, accelerating and decelerating in cyclic fashion.

In one form, the relative pivotable movement between the active float 12 and reactive body 14 may be directly coupled to the rotational drive shaft input of the electrical generator via mechanical linkages and/or couplings, such as an oscillating drive shaft or the like. For example, an oscillating drive shaft may be mounted to the active float 12, with the generator frame referenced to reactive body 14, and the drive shaft may be arranged to oscillate back and forth in response to relative pivotable movement between the bodies 12,14. It is preferable that the low inertia components of the generator (i.e. the rotating components) are connected to the active float 12 to maintain the low overall inertia and fast response of this body. The oscillating drive shaft may also be coupled via mechanical linkages and/or couplings to the rotational drive shaft input of the electrical generator to cause it to generate electrical energy. The pivotable movement could alternatively be directly transferred to the rotational drive shaft of the electrical generator via hydraulic couplings if desired. It is preferable that the overall inertial response of the drive system used be fast enough that cyclic direction changes are possible without inherently creating further phase lag within the active float 12 response to the wave excitation forces.

As mentioned, the pivotable movement may be indirectly coupled, either mechanically or hydraulically, to the electrical generator via an optional mechanical gearbox or hydraulic speed/torque converter. The gearbox or speed/torque converter may be arranged as an interface between slow pivotable movement between the bodies 12,14 caused by slow wave motion and the electrical generator, in particular by increasing rotational speed to create more efficient energy transfer from the wave motion to the electrical generator.

In one possible form, the coupling system may comprise an oscillating shaft that is indirectly coupled to the electrical generator via, for example, a 1:30 ratio mechanical gearbox. The gearbox may, for example, be mounted at the pivot axis 16 to one or the pivotable connections or couplings, and a secondary shaft or shafts could provide 90 degree drive to the electrical generator that may, for example, be mounted to the reactive body 14 below the Mean Sea Level (MSL). Alternatively, the electrical generator may be mounted to a housing that is fixed to the reactive body 14 but which extends above the MSL. This is the preferred option as it would allow for easier access for adjustments and servicing of the power output system components. By way of example, the electrical generator may be co-mounted with a mechanical gearbox at the pivot axis 16 to one or more of the pivotable couplings or connections or the reactive body 14.

As mentioned, a direct hydraulic coupling or linkage to the electrical generator is also an alternative arrangement. Hydraulic couplings introduce losses in the hydraulic circuits, but allow high gearings to be obtained and this must be weighed up against the losses and generator sizing requirements resulting from a slower speed shaft or mechanical gear losses. By way of example only, the power output system may utilise a standard 50 Hz induction generator operating at low variable speed via a regenerative motor drive system. The motor drive interfaces the 400 Vac electrical system in the normal manner, but is primarily controlled in regeneration mode to extract power from the wave energy mechanical system rather than as in a normal drive system where the electrical system would provide power to drive a machine shaft connected to a load. Because an adaptation of a standard regenerative electronic drive is used, sophisticated power factor correction technology is inherent, and power quality is not compromised. Further, the coupling system may comprise a hydraulic rectifier to convert the oscillating rotational movement at the pivot axis 16 into rotational movement in one constant direction for driving the electrical generator.

Figure 10:
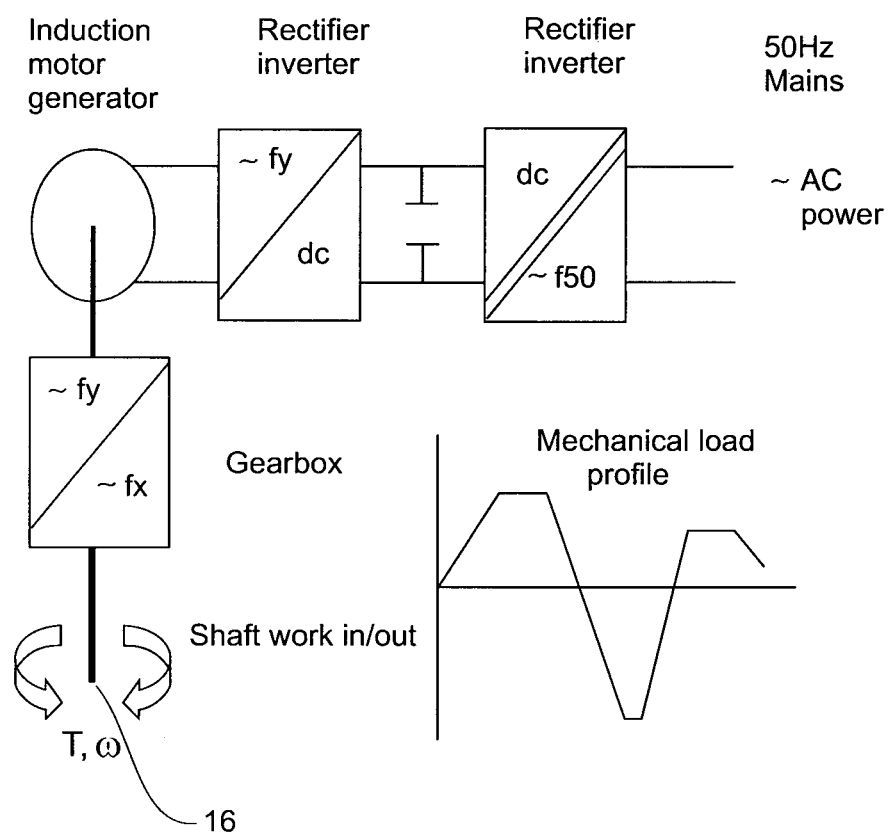
FIG. 10 is a block diagram of a proffered form of power output system of the wave energy converter that utilises active torque loading.

Referring to FIG. 10, the preferred power take off system comprises a gearbox speed transition or direct shaft power transfer to an induction generator with a high pole number which is connected via a controllable bidirectional inverter system to the standard ac power system source. The generator is located on the wave energy converter in the reactive body 14 with input shaft coupled to the active float pivot axis 16. The inverter system provides excitation to the generator at the required frequency and voltage to track the active float motion and also inverts the power generated into the ac system at the correct ac voltage and frequency (for example 400 Vac and 50 Hz) using well known techniques in the art of electrical engineering. Control of the electrical power flow to the grid via the inverter applies controlled torque loading to the active float 12 and forces it to follow a preferred trajectory. The trajectory is calculated from sensor information which collects real time wave characteristics and allows the device to rapidly and continually adapt to maximize energy capture for specific wave conditions (with a time lag of less than a second). An alternative and more advanced drive system is to use a specially designed generator with a large number of magnetic poles, in which case higher electrical efficiency can be obtained without resorting to a mechanical or hydraulic means to increase the generator shaft speed.

The wave energy converter 10 may also preferably comprise a control system, either as part of the power output system 17 or as a separate module. The control system may be operable, either automatically or manually, to control the power output system and other auxiliary systems and sensors. For example, the control system may comprise power electronic or other electrical controls that are operable to very rapidly modify the power take-off via active loading at the pivot axis 16. In particular, the control system enables instantaneous adjustment of mechanical damping via torque control at the pivot axis 16. This enables the control system to actively control the position of the active float 12 relative to the reactive body 14 via adjustment of the electrical power being extracted, in other words the torque loading at the pivot axis 16. This may include power flow reversal to actively position the active float 12. Because the active float 12 is low mass (relative to water) there is low inertia associated with this response. Hence the Wave energy converter 10 is inherently responsive to changing wave profiles, as happens within a wave length due to additive waves. Therefore, in the preferred form the wave energy converter is arranged to respond to the higher frequency energy components of the wave motion that were discussed with reference to FIG. 1*b* and can adjust its loading or damping to varying wave profiles and frequencies for extracting more energy from a real wave.

It will be appreciated that the control system may be programmed to automatically adjust the torque loading (or electrical damping) at the pivot axis 16 in response to wave profiles detected by sensors. In particular, the loading can be changed by the control system very quickly, for example within a few degrees of the wave cycle, so the response of the wave energy converter 10 can be adjusted to track real or arbitrary sea wave profiles. Further, the control system may comprise short-term look-ahead algorithms that are arranged to predict the wave profiles within each cycle, for example the sub-predominant wave-shape, and adjust the torque loading to position the active float 12 for maximum energy extraction from passing waves. In the preferred form, the relatively low mass active float 12 is light enough to be continually responsive to a wave-shape. It always has a natural resonance frequency that is much higher than the dominant wave frequency, for example an order of magnitude, and its response to wave excitation forces is primarily effected by hog much energy is extracted through the electrical generator of the power output system.

The reactive body 14 is an energy storage member by virtue of its larger mass and its response is not controllable in the same way, although the variations in reaction torque of the reactive body are affected by the active float loading. By way of example, the control system may be arranged to maintain the pivot axis 16 substantially at the MSL by actively adjusting the net torque loading at the pivot axis 16 such that the active float 12 operates about a 90° angle as shown in FIG. 1c.

Storm Survival Mode

The control system may be arranged to protect the wave energy converter 10 in overload conditions, for example during a storm when the waves become too violent. For example, the control system may be arranged to detect or sense an overload condition and initiate a non-responsive or storm survival mode where the reactive body 14 could be arranged to sink below the wave troughs 26 leaving the active float 12 partially loaded vertically as shown in FIG. 4. By way of example, this may be achieved via a mechanical brake provided at the pivot axis 16 that is operable by the control system to restrict movement between the active and reactive bodies 12,14 in the extended position shown in FIG. 4. In this extended position, the wave energy converter 10 would float substantially beneath the surface of the waves thereby being protected from damage.

Dimensions of Wave Energy Converter

It will be appreciated that the size of the wave energy converter may be varied and will depend on the significant wave height and/or wavelength at the chosen deployment site. Preferably, the wave energy converter 10 is dimensionally small (in both parallel and perpendicular directions relative to the wavefronts) compared to the wave height and/or wavelength of the wave motion in the sea. This is important for operation in real seas where the wave crests are short and the periods are variable. In the preferred form, the effective length of the active float 12 may be, by way of example only, in the order of approximately $\frac{1}{2}^{th}$ of the significant wave height (trough-crest). Therefore, a wave energy converter 10 for 2 m waves will have an active float 12 with a center of buoyancy at about 1 m from the pivot axis 16. The length of the reactive body 14 may, by way of example only, be in the order of approximately $\frac{1}{10}^{th}$ of the average wavelength in the chosen deployment site.

As mentioned above, the effective pivot length of the active float 12 may preferably be approximately half the height of the maximum wave from which energy is to be extracted. This defines the peak power of the wave energy converter 10 for a particular wavelength. Beyond this point the power output will level off, in a similar manner to a wind turbine. The length of the reactive body 14 defines the wavelengths over which the wave energy converter will absorb maximum energy. As mentioned above, the reactive body 14 may preferably be in the order of $\frac{1}{10}^{th}$ of the wavelength for the wave energy converter to absorb sufficient energy from the wave. If it is too short, it does not describe an appropriate motion in the wave energy field to be an efficient wave energy converter at any particular wavelength. It will be appreciated that the lengths of the active float 12 and reactive body 14 relative to the wave height and/or wavelength may be varied from the ratios mentioned above.

The submerged floating "buoyancy-to-weight" ratio of active float 12 can vary quite widely, but it is preferably significantly greater than 1. There will be an optimum under various conditions. Mass is required to store some energy on the upward movement which is recovered on the downward movement, whilst also ensuring that the active float will track downward movement of the sea surface level. By way of example, the buoyancy-to-weight ratio of the active float 12 may be in the range of 1.5:1 to 10:1, and more preferably in the range of 2:1 to 4:1. The submerged buoyancy-to-weight ratio of reactive body 14 on the other hand is very close to 1, preferably in the range of 0.8:1 to 1.2:1, and more preferably in the range of 0.9:1 to 1.1:1 so that it may be self floating or self submerging, in which case the attachment to active float 12 keeps it afloat.

The mass of the reactive body 14 is preferably large compared to that of the active float 12. The way this reactive body acts strongly depends on sea conditions and particularly on wavelength, and a compromise is required to "tune" it for enhanced overall device performance in average sea conditions. The "reactive body-to-active float" weight ratio may preferably be in the range of 5:1 to 30:1, and more preferably in the range of 10:1 to 20:1 for effective operation. The positions of the center of buoyancy and the center of mass of the reactive body 14 are important design parameters, as is the mass density distribution about the reactive body. Fundamentally, the center of mass must remain below the center of buoyancy at all times, or the reactive body 14 will become unstable and will flip. Preferably, the center of buoyancy of the reactive body 14 is controllable to select the appropriate pitching response. By way of example, the reactive body may comprise a high density (SG>>1) concrete/rock aggregate or metal volume at the bottom and a low density (SG<<1) air or rigid foam volume at the top, with trapped sea water (SG~=1) to provide distributed neutral buoyancy volume as required, to separately define pitch and heave response characteristics of the reactive body, platform or spar. By way of example, concentrating the mass about a particular point compared with a uniformly distributed mass reduces pitch inertia (and the ability of the body to store pitch energy) about that point, but has minimal effect on heave inertia (and the ability of the body to store heave energy). Separately defining these response characteristics is an important feature of the wave energy converter. Furthermore, the shape of the reactive body 14 is important to the manner in which it reacts in relation to heave and pitch movements. In relation to heave, low acceleration results from low force (dependent on the cross-sectional area at the surface) and high inertia in the heave direction. In relation to pitch, high acceleration results from high force (dependent on a large surface area facing the wave flow direction) and low rotational inertia.

Operation of Wave Energy Converter

Figure 4B:
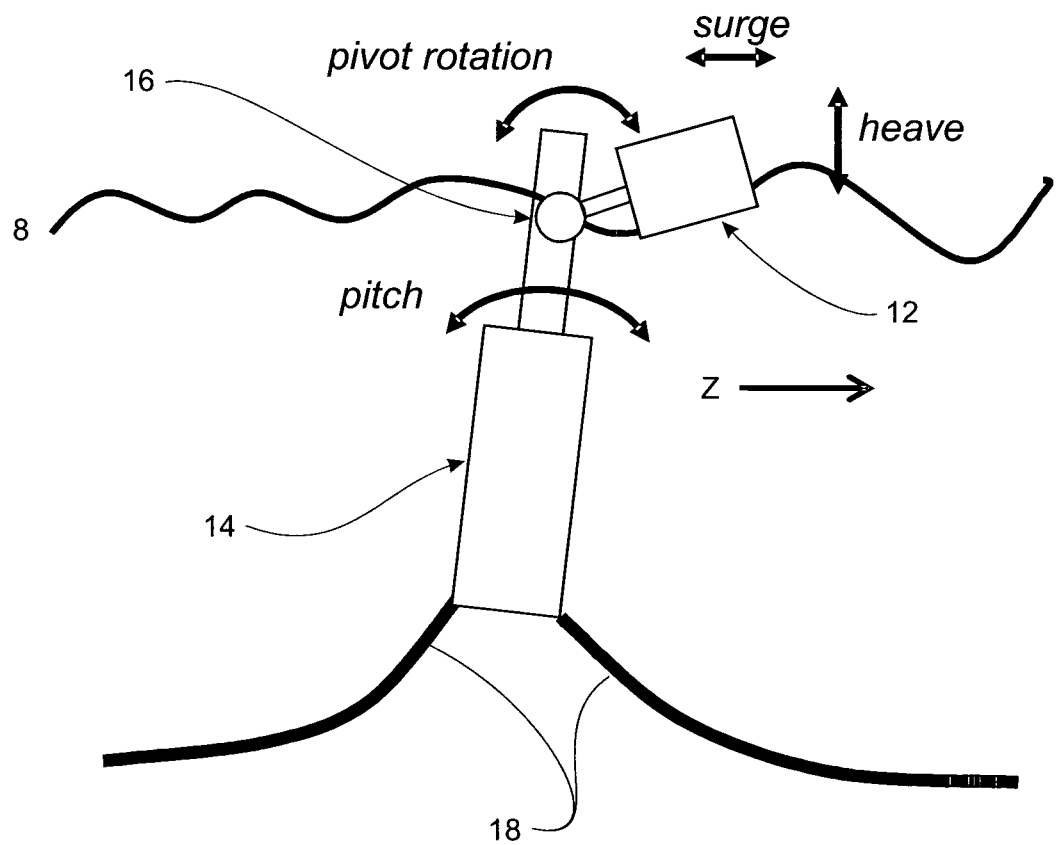
FIG. 4b shows a functional depiction of the basic motions described by the active flow and reactive body when subjected to idealised wave motions.

The typical operation of the single active float configuration wave energy converter 10 will now be described in more detail. Referring to FIGS. 4a and 4b, the idealised motions of the active float 12 and the reactive body 14 coupled at the pivot point 16 are shown in response to waves 8 travelling in direction Z, and with the Mean Sea Level being indicated by the line MSL. The active float 12 trajectory 12a tends to follow the water particles subjected to wave excitation, which move in a circular motion, with diameter of the circle equal to wave height. Reactive body 14 trajectory 14a tends to pitch about its bottom, in response to the exponentially decreasing amplitude of the water particle motion. This coupled motion results in a cyclic flexing about the pivot 16, from which power can be taken off. Reverting to FIG. 1c, the wave energy converter 10 is shown in a rest or static position. The active float 12 being buoyant and having low inertia, rests in a substantially horizontal orientation on or toward the ocean surface, and the reactive body 14 having neutral buoyancy and low center of mass rests in a substantially submerged state and vertical orientation. As described, the reactive body 14 preferably has low buoyancy restoring force so that it is not responsive in the vertical direction. Further, the surfaces of the active float 12 and reactive body 14 can be shaped to maximise interaction with passing waves in a controllable manner, so that the active float 12 and reactive body 14 oscillate forcibly about the pivot axis 16 to extract maximum wave energy. Useful energy, such as electrical power, is extracted by actively loading an electrical generator to the pivotable movement at the pivot axis 16. The low inertia or rotor section of the generator is preferably coupled to the low inertia active float 12 and the high inertial frame of the generator is mounted on to the high inertia reactive body 14 which acts as a passive reference platform for the generator frame.

Most energy is extracted by interaction between the active float 12 and the most intense potential and kinetic energy flows in the upper portion of the body of water This energy is transferred though the wave energy converter 10 as torque about the pivot axis 16, with the reactive body 14 providing the necessary reaction. The operation of the wave energy converter can be enhanced if the reactive body can be encouraged to store energy and transfer it as a reaction force via the pivot axis 16 or pivot shaft at an appropriate stage in the wave cycle. This is a form of bi-modal energy transfer, where it is transferred out of the reactive body 14 by a different mechanism and form than it entered. In particular, wave energy is transferred to the reactive body 14 as inertial pitching about a low center of mass point, and as heave motion and transferred out as torque from a different pivot axis 16 (at the top), through reaction against the active float forces at the pivot. More specifically, bi-modal energy extraction is achieved by absorbing rotational kinetic energy and vertical potential into the reactive body by wave forces acting on said body and extracting this rotational energy by resisting movement of the reactive body through torque about the pivot axis 16

To achieve pivotable movement about the pivot axis 16, the active float 12 is primarily forced upwards in a vertical direction by buoyancy forces and downwards by its own mass. In addition, hydrodynamic forces from the rotational motion of the water particles assist in vertical and horizontal directions, and also tend to drive the active float 12 in a circular manner. Resistance to this motion by torque loading at the pivot axis 16 transfers energy from the passing waves to the power output system 17. Load resistance reduces the amplitude of the low inertia active float 12 trajectory, but because it is light, it can respond rapidly and follow an irregular wave profile. The active float 12 does not simply oscillate in a heaving motion as useful energy can also be extracted from the horizontal motion (surge) coupled to pitch action of the reactive body by virtue of the extended angle achieved about the pivot axis 16.

Figure 5:
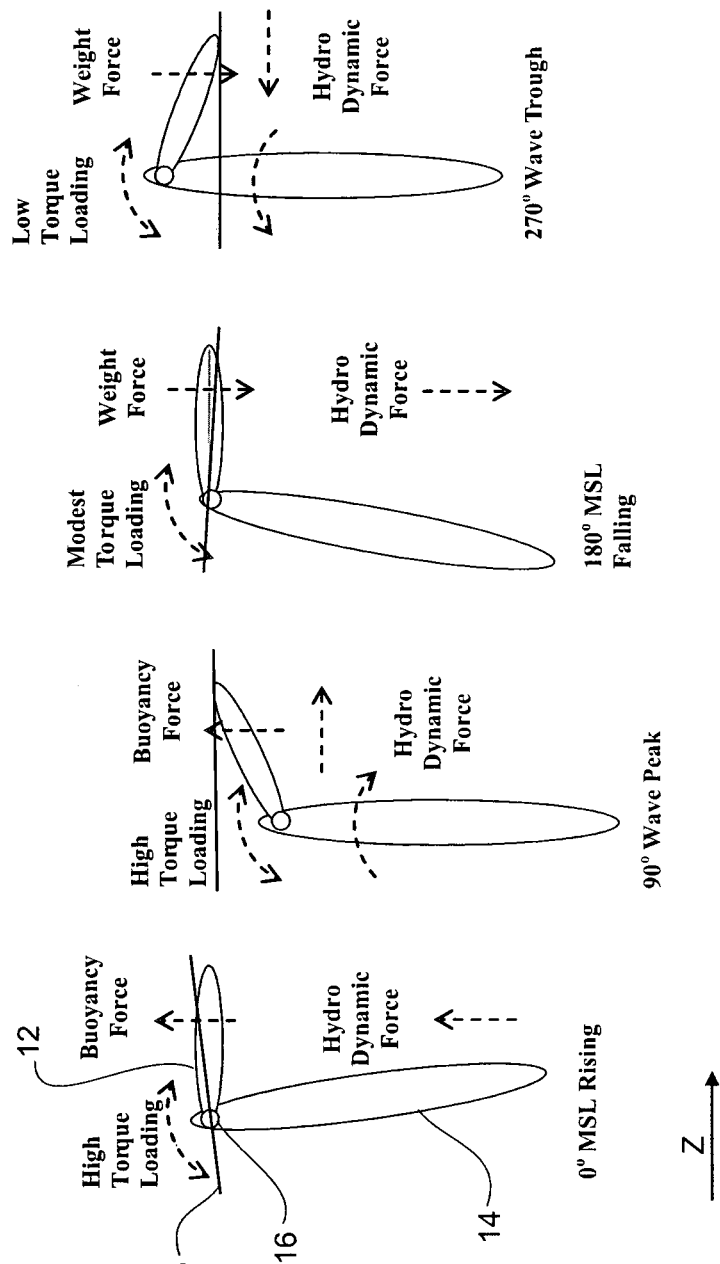
FIG. 5 shows a schematic diagram of one form of heave and pitch motion of the active float and reactive body of the wave energy converter of FIG. 1c over a typical passing wave cycle.

Referring to FIG. 5, the typical heave and pitch motions of the wave energy converter 10 during four stages of a passing wave cycle will be described by way of example only. The wave level is indicated generally by reference 28. It can be seen that pitching action of the reactive body 14 can increase the rotation angle or pivotable movement about the pivot axis 16.

The wave energy converter 10 can be oriented either upstream or downstream of the wave direction and it will be appreciated that the wave energy converter may operate at various ocean depths, from shallow, where the minimum depth is only a few meters greater than the immersed height of the reactive body, to very deep. The following wave cycle example of FIG. 5 assumes a downstream orientation, i.e., the wave energy converter points away from the wave front. Alternatively both upstream and downstream active floats may be arranged in a manner that makes orientation largely irrelevant.

Description of Motions for a Typical Wave Cycle

MSL Rising (0°):

Water moving vertically upwards, plus the buoyancy force will tend to move the active float 12 upwards and also forward from drag force as the water velocity vector rotates towards the horizontal as the wave crest approaches. As the water continues to move up around the active float 12, the vertical forces rotate the active float about the pivot axis 16 extending the pivot angle. The reactive body 14 maintains a relatively stationary position in the vertical direction because of its mass, bottom mooring and/or drag plates located in the relatively still water at the bottom of the reactive body. It is however pitched forward (towards the right) away from the advancing wave crest at the top, as the water velocity vector rotates towards the horizontal as the wave crest approaches. Controlled load torque is applied to the pivot axis by the control system resulting in work done simultaneously against both vertical and horizontal wave energy components.

Wave Peak (90°):

Water now moving in the forward horizontal direction will tend to start moving downwards as the water velocity vector rotates towards the vertical as the falling wave approaches MSL. As mentioned, the active float 12 can also be hydrofoil shaped and streamlined to modify horizontal drag, and to provide lift forces resulting from the horizontal wave particle motion which is faster than the float horizontal motion. The weight of the active float 12 plus downward lift force starts to rotate the active float about the pivot axis 16 decreasing the pivot angle. The water moving in the forward horizontal direction will also tend through drag forces on the upper part of the reactive body 14 to have returned the reactive body to the more vertical position. Controlled load torque is applied to the pivot axis by the control system, resulting in work done simultaneously against both vertical and horizontal wave energy components.

MSL Falling (180°):

Water now moving downwards in the vertical direction plus the mass of the active float 12 will tend to now allow the active float to continue to pivot downwards under its own weight, since the buoyancy forces is now minimal, further decreasing the pivot angle. The reactive body 14 will be held relatively stationary in the vertical direction because of its mass, bottom mooring and/or drag plates in the relatively still water at the bottom of the reactive body. It is now pitched away from the advancing wave trough at the top, as a result of the forward horizontal motion of the water in the previous wave quarter phase. A lower level of active torque loading is applied to the pivot axis 16 by the control system to extract power from the potential energy stored in the mass of the reactive body 14 and also from hydrodynamic force on the active float 12 caused by the downward water motion.

Wave Trough (270°):

Water now moving in the backward horizontal direction will not apply any significant vertical force to the active float 12 which is now resting on the surface. The active float 12 will tend to start moving upwards again as the water velocity vector rotates towards the horizontal as the rising wave approaches MSL, re-extending the pivot angle. The reactive body 14 is now vertical, but drag forces on the upper part of the reactive body from water moving in the backward horizontal direction will tend to tilt it towards the oncoming wave. Torque loading is again applied to the pivot so that the torque force builds up rapidly to overcome the pitching motion of the reactive body 14.

Figure 6:
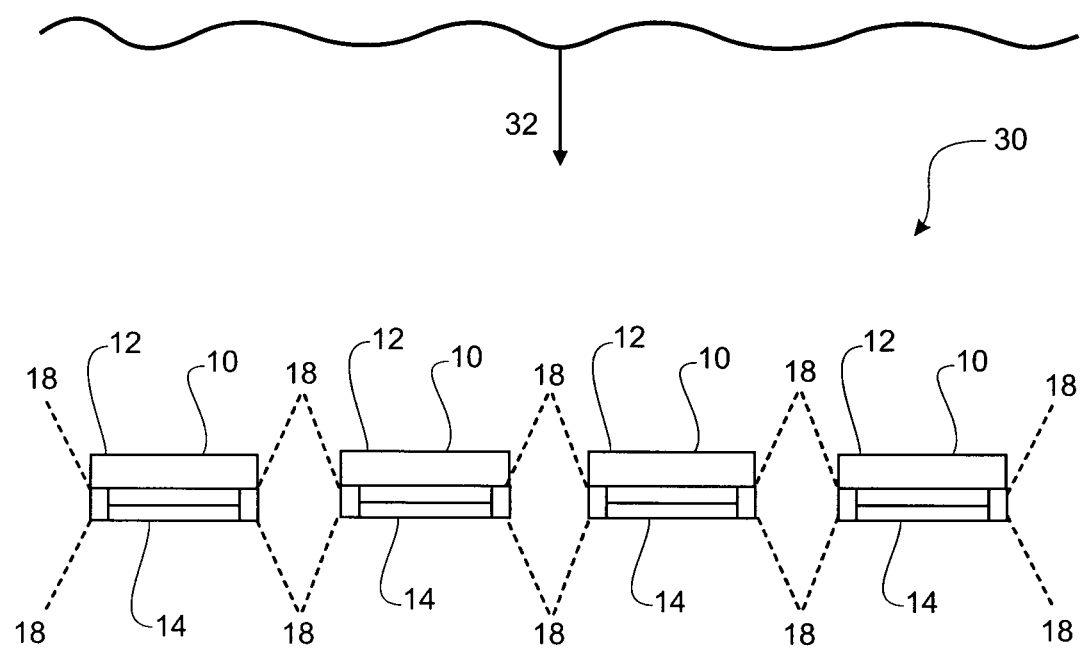
FIG. 6 shows a schematic horizontal plan view diagram of a wave energy conversion system having a chain of linked wave energy converters of the invention.

Referring to FIG. 6, it will be appreciated that multiple wave energy converters 10 may be linked together via slack mooring cables 18 to provide a wave energy conversion system 30 of higher overall power output capacity. In particular, a number of wave energy converters 10 may be deployed in long chains parallel to the predominant wave direction. Each wave energy converter may be up to 10 m wide, with sufficient space being provided between each of them to avoid clashing in storms. The mooring system cables 18 will preferably be utilised to keep the wave energy converters 10 facing the wave front, generally indicated by arrow 32, as the natural tendency will be for the devices to turn away to the path of least resistance. Orientation through mooring can be assisted by other known means such as rudders, vanes or self orientation shape of the floating reactive body structure.

Figure 7:
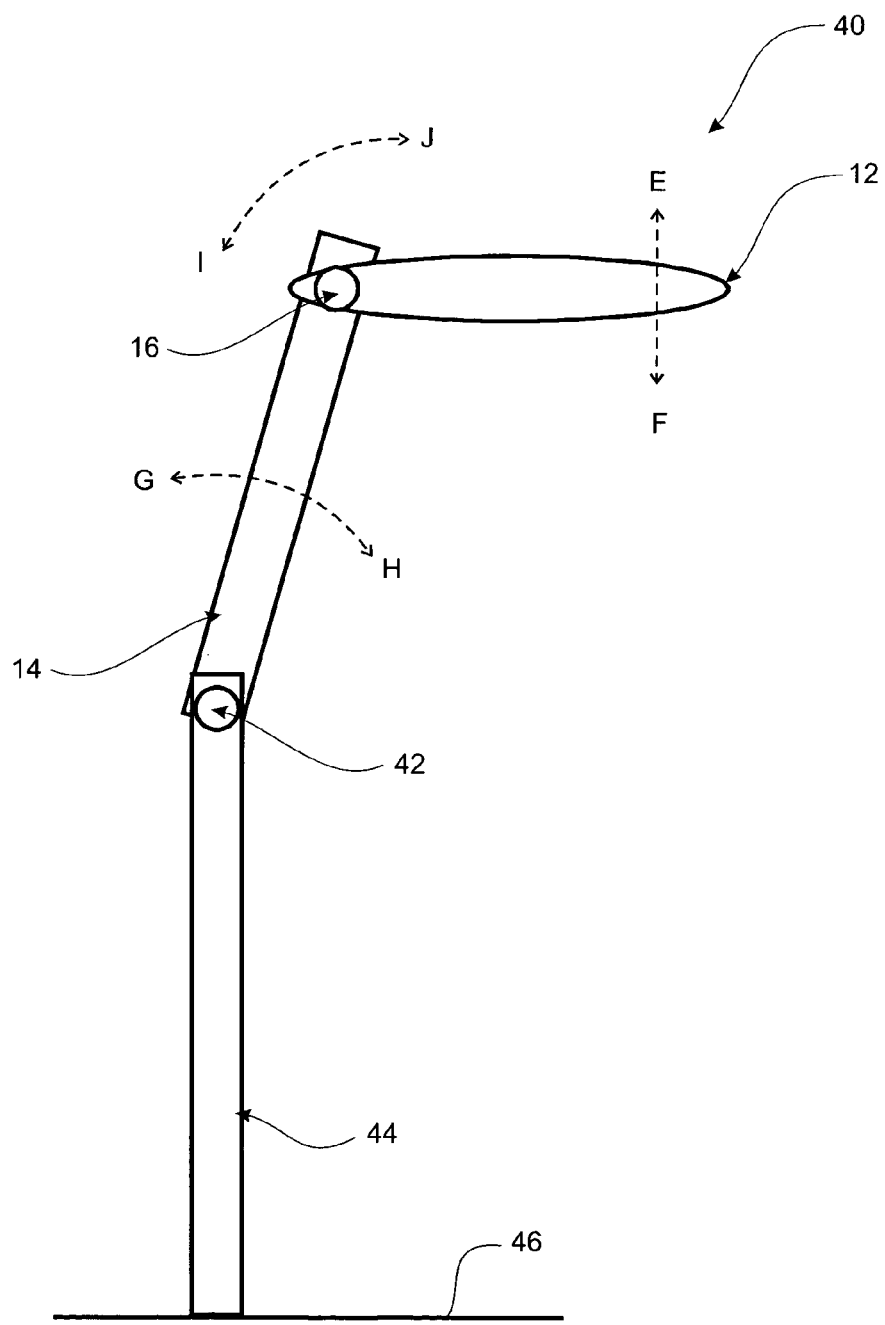
FIG. 7 shows a schematic diagram of a wave energy converter of the invention that utilises a flexible reference frame that is fixed to the seabed.
Figure 8A:
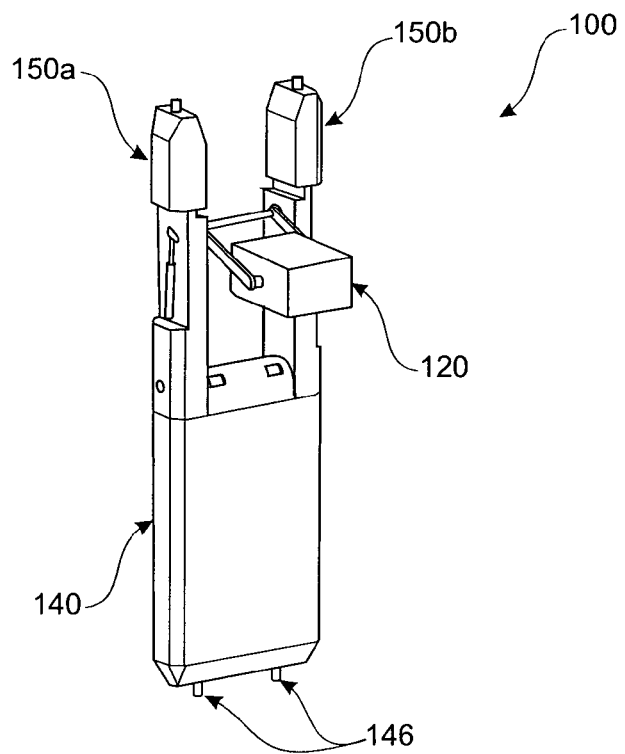
FIGS. 8a-8e show perspective, side, front, and plan views respectively of a first preferred embodiment of the wave energy converter of the invention.
Figure 8B:
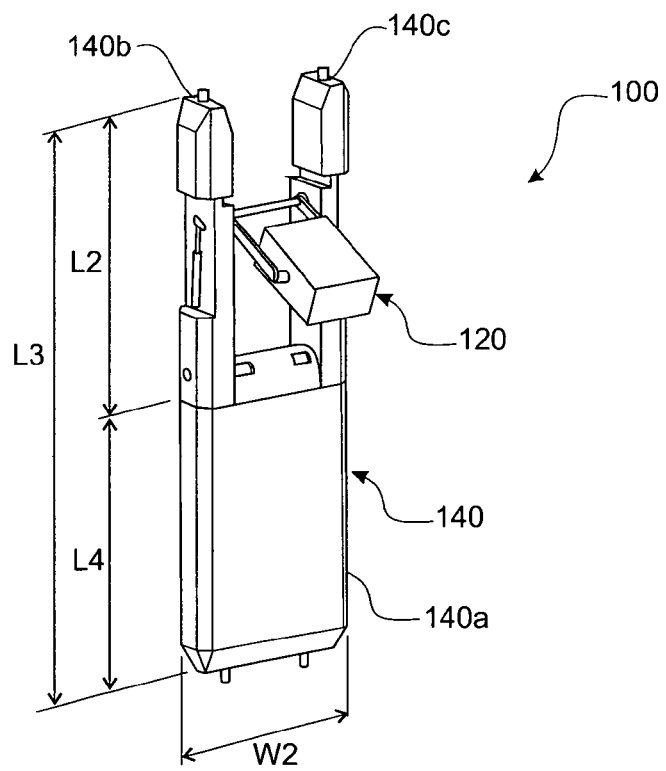
Figure 8C:
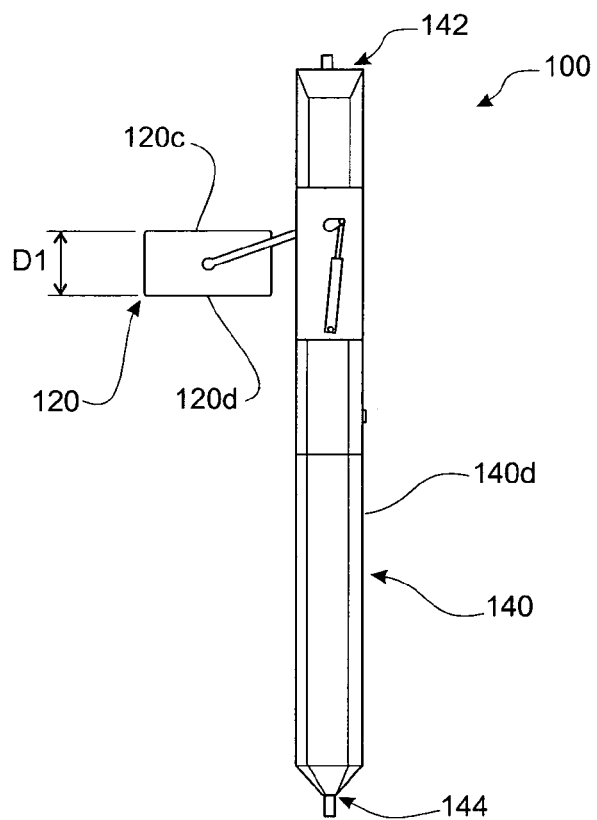
Figure 8D:
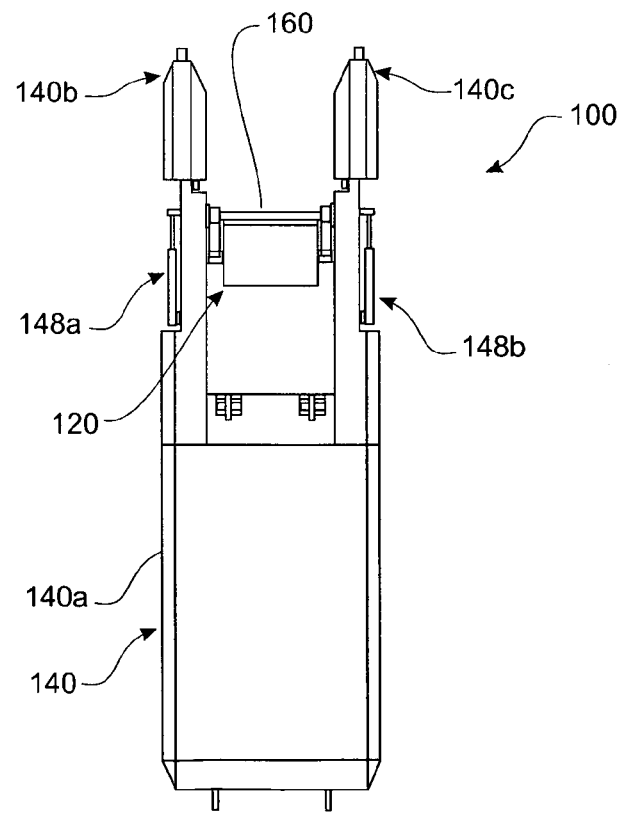
Figure 8E:
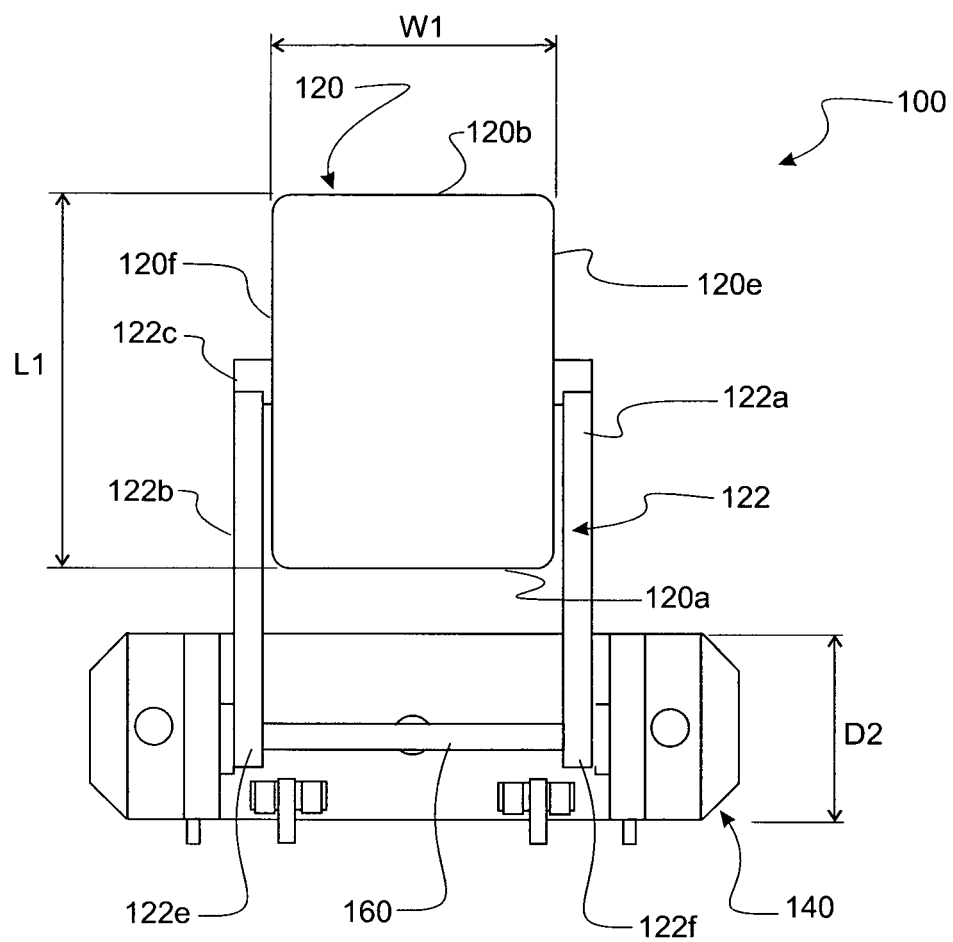
Figure 9A:
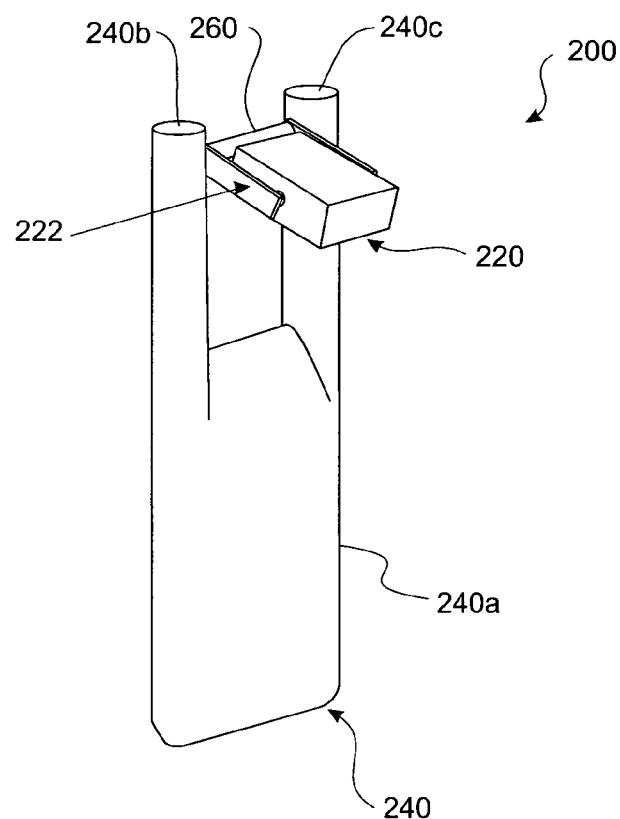
FIGS. 9a-9e show perspective, side, front, and plan views respectively of a second preferred embodiment of the wave energy converter of the invention.
Figure 9B:
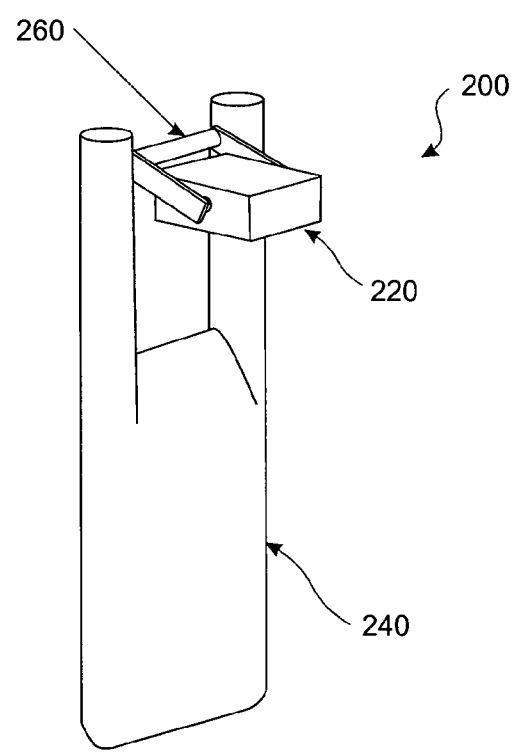
Figure 9C:
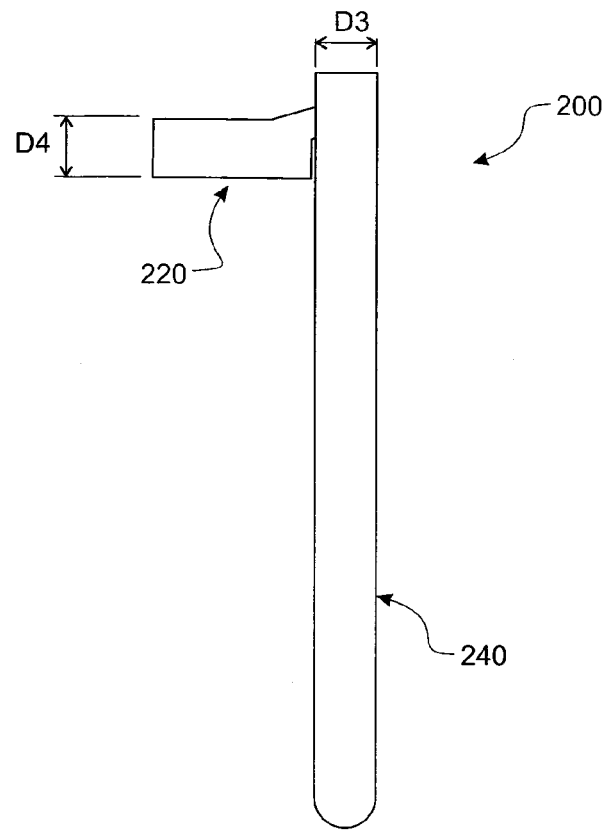
Figure 9D:
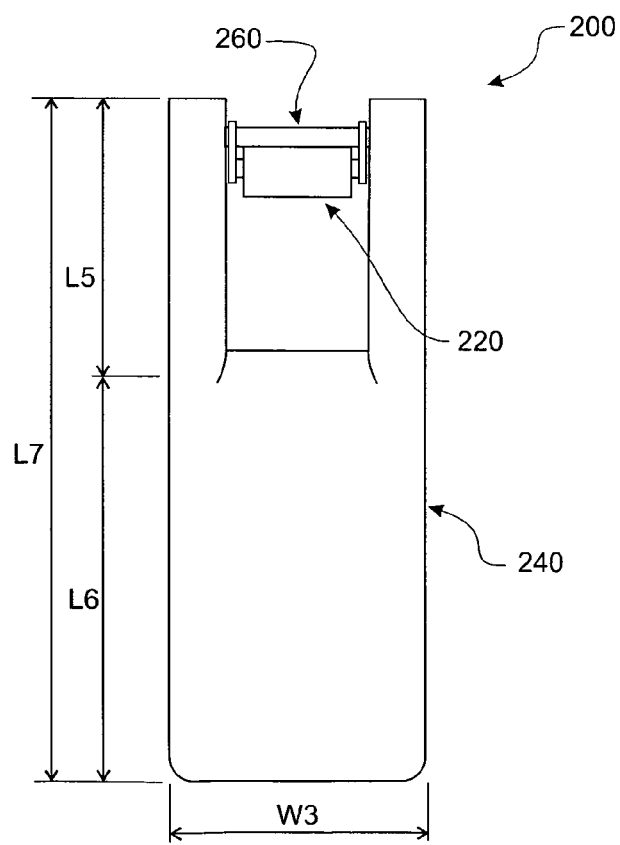
Figure 9E:
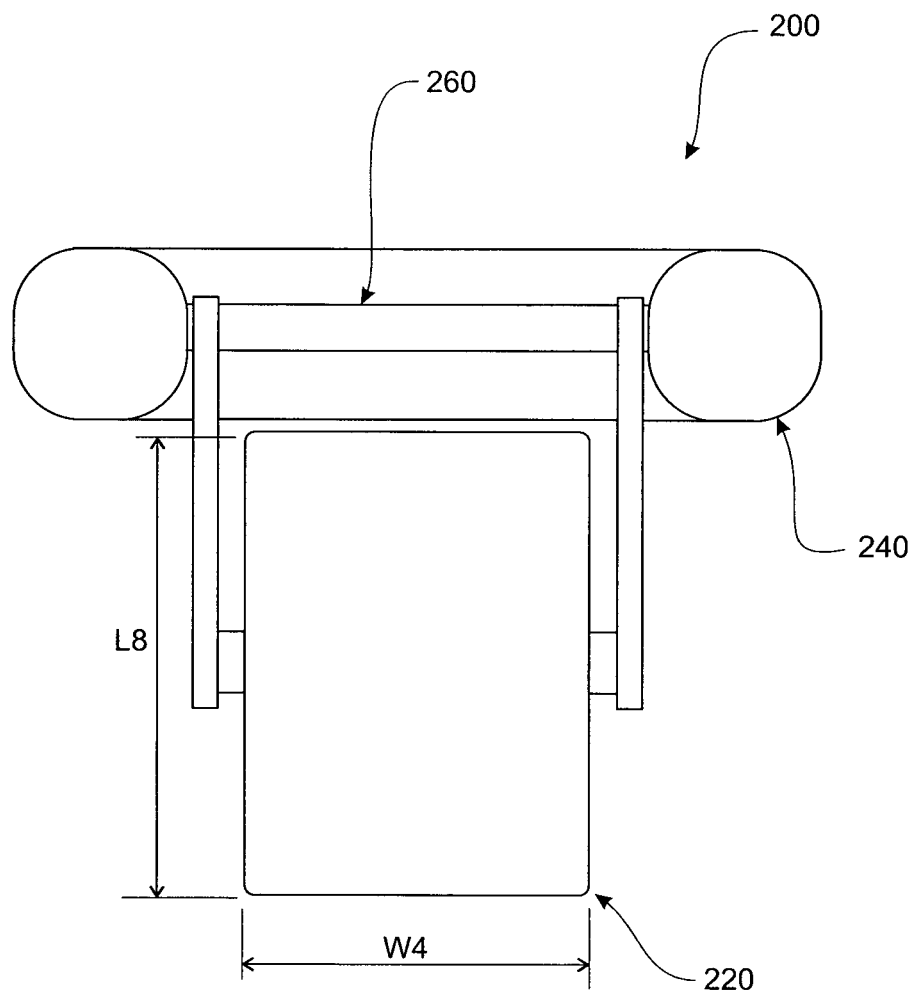

Referring to FIG. 7, an alternative form of the wave energy converter 40 is shown in which the bottom end of the reactive body 14 is pivotably coupled at 42 to a reference frame 44 that is fixed to the seabed 46, rather than slack mooring cables that are fixed or anchored to the seabed. By way of example, the reference frame 44 may be an incompressible but horizontally flexible strut that may be adjustable in height for MSL variation due to the tides. Alternatively, a longer active float could be utilised with such an arrangement to compensate against MSL variation.

It will be appreciated that the wave energy converter may have more than one active floats pivotably coupled to a single reactive body if desired to increase power output capacity, or make the device omnidirectional. In particular, the pivotable movement between the multiple active floats and the single reactive body could be combined and transferred into one power output system or alternatively separate power output systems may be provided for each respective active float. Also, it will be appreciated that there may be multiple reactive bodies pivotably coupled to one or more active floats in other multi-limbed forms of the wave energy converter.

First Preferred Embodiment 2 kW Experimental Device

Referring to FIGS. 8a-8e, a first preferred embodiment of the wave energy converter 100 in the form of a 2 kW experimental device will be described.

2 kW Experimental Device—Active Float

The active float 120 is substantially elongate extending between a first 120a that is proximal to the reactive body 140 and a second 120b end that is distal to the reactive body. The cross-sectional area between the ends 120a,120b is defined peripherally by opposed top 120c and bottom 120d surfaces that are joined by opposed side surfaces 120e, 120f. The active float 120 has a uniform cross-sectional profile along its length, although it will be appreciated that a non-uniform profile could alternatively be used. The active float 120 has a length L1 of approximately 1.0 m, width W1 of approximately 0.7 m, and a depth D1 of approximately 0.5 m. The active float 120 has a dry weight of approximately 350 kg. The active float 120 is indirectly pivotably coupled to the reactive body 140 by a sub-frame 122 comprising two connecting arms 122a,122b that extend perpendicularly from a cross-member component 122c. In particular, the cross-member 122c extends through width of the active float 120 at or toward the middle of the length of the active float. The free ends 122e,122f of the connecting arms 122a,122b are pivotably coupled to the pivot axis or shaft 160 provided on the reactive body 140 to thereby enable the active float 120 and reactive body 140 to pivot relative to each other about pivot axis 160. Therefore, the active float 120 has at least one degree of freedom in that it can pivot relative to the reactive body 140. The active float 120 may be fixed and locked rigidly to the cross-member 122c in a particular orientation or alternatively the active float can be arranged to be freely pivotable about the cross-member thereby providing it with two degrees of freedom. With two degrees of freedom, enhanced energy extraction may be obtained as the orientation of the active float can conform to the wave-shapes to ensure maximum surface contact with the waves. It will be appreciated that the active float 120 could alternatively be directly pivotably coupled at or toward one of its ends to the reactive body 140 if desired.

It will be appreciated that the active float 120 can be of many different shapes and cross sections. For example, the lower surface 120d of the active float 120 can be flat or pan shaped to provide very rapid application of wave buoyancy force. Different sizes of device and levels of sophistication of the control system for different market applications require different float profiles. Drag plates can also be added to the active float 120 to enhance movement in certain directions due to hydrodynamic action of wave motion. Also, as identified earlier, the reactive body 140 can have negative buoyancy and be held with pivot axis 160 on or about the surface by active float 120 having a buoyancy profile which extends in part to and/or beyond the pivot axis 160 (e.g. by using hollow floatation attachment arms) such that its buoyancy force alone maintains the reactive body 140 afloat. This configuration allows maximum submerged mass/volume ratio to be designed into the reactive body 140 to optimise its inertial efficiency.

2 kW Experimental Device—Reactive Body

The reactive body 140 is substantially elongate and in operation extends in an upright substantially vertical position between a top end 142 facing skyward and a bottom end 144 extending into to the sea water. The reactive body 140 comprises a main body 140a from which two upright support arms 140b,140c extend. The active float is pivotably coupled by the sub-frame 122 to the pivot axis or shaft 160 that extends between the two support arms 140b,c of the reactive body 140. The support arms 140b,c are of sufficient length relative to the dimensions of the sub-frame 122 and active float 120, and in combination 30 with the location of the pivot axis 160, to allow the active float 120 to fully rotate 360°. The reason for the full rotation capability of active float 120 about pivot axis 160 is survivability. Normal operation is with the active float 120 moving up and clown around ±45° from the horizontal, and the reactive body 140 pitching up to ±20° from the vertical.

Hence relative angular travel between the active float 120 and reactive body 140 can be as much as ±65° under normal operation at design wave height when the pivot is unloaded. Under stormy conditions, pivotal movement may be more extreme and the ability of the active float 120 to fully rotate relative to the reactive body 140 reduces the risk of damage occurring to the device.

The reactive body 140 has a full length L3 of approximately 6.5 m, width W2 of approximately 2.0 m, and a depth D2 of approximately 0.5 m. The length of the support arms 140b,c is approximately 3.5 m and the length L4 of the main body is approximately 3.0 m. The dry weight of the reactive body 140 is approximately 750 kg, and the wet weight is approximately 3000 kg. Therefore, the length and width of the main body 140a of the reactive body 140 is such that a sufficiently large active surface area 140*d* is created upon which the wave motion may act, and this in combination with the relative overall length of the reactive body causes it to pitch.

Mooring rope connection points 146 for one or more mooring ropes to connect to are provided at the bottom end 144 of the reactive body 140. The device is preferably slack moored and the mooring rope connection points being located at the center of pitch of the reactive body, which may not necessarily be toward the bottom end of the reactive body. The mooring ropes may be securely fixed at the other end to the sea bed or another suitable anchor point.

It will be appreciated that the reactive body could alternatively be shaped like a tuning fork, or any other suitable configuration that enables the active float 120 to fully rotate using the goal-post like design.

2 kW Experimental Device—Power Output System

The power output system is located on and within the support arms 140*b,c*. The pivotable movement between the active float 120 and reactive body 140 at the pivot axis 160 is extracted by a coupling system that comprises double-acting hydraulic cylinder and ram arrangements 148*a,b* that are operatively coupled to the pivot shaft 160 and acting about trunnion. In operation, oscillatory pivotable movement about the pivot shaft 160 causes the hydraulic rams to oscillate back and forth with their respective cylinders and thereby pumping hydraulic fluid through conduits or hoses to drive hydraulic motors located within chambers 150*a,b* provided at the top of the support arms 140*b,c*. The hydraulic motors each have a rotational drive shaft output and this is coupled to the input of electrical generators to generate electrical energy for applying to a load. It will be appreciated that the electrical generators may be arranged to receive an oscillating rotational drive output from the hydraulic motors or alternatively hydraulic rectifiers may be incorporated into the system to provide a rotational drive output in a single direction for driving the electrical generators. The control electronics of the control system is located in the chambers 150*a,b*, which are preferably sealed. The control system includes the active torque loading functionality for controlling the load via power electronics inverters.

Second Preferred Embodiment 100 kW Device

Referring to FIGS. 9*a*-9*e*, a second preferred embodiment of the wave energy converter 200 in the form of a 100 kW device will be described. The 100 kW device is similar in design to the experimental 2 kW device 100, but is larger in scale. The device 200 comprises an active float 220, reactive body 240 (with a main body 240*a*, and support arms 240*b,c*), and a sub-frame 222 for pivotably coupling the active float to the reactive body to enable relative pivotable movement between the bodies about pivot axis 260. The power output system may be as described previously and may be integrated into the support arms 240*b,c* of the reactive body 240.

The total length L7 of the reactive body 240 is approximately 20 m, with the length L5 of the support arms 240*b,c* being approximately 6.8 in and the length L6 of the main body 240*a* being approximately 13.2 m. The reactive body 240 has a width W3 of approximately 7.5 m and a depth D3 of approximately 1.6 m. The dry weight of the active float 220 is approximately 20,000 kg. The active float 220 has a length L8 of approximately 4.2 m, width W4 of approximately 3.2 m, and depth D4 of approximately 1.5 m. The dry weight of the reactive body 240 is approximately 10,000 kg and its wet weight is approximately 135,000 kg.

Construction Materials for the Active Float and Reactive Body

For large devices, the active float is primarily of corrosion protected steel construction with internal ribs and bracing for strength. For smaller low power devices of 1-10 kW rating the outer skin may be of tough semiflexible polymer such as polypropylene or similar. In both cases it may be filled with air entrapping foam material for higher reliability against possible damage to the external skin and subsequent leaks. Its fully immersed buoyancy-to-weight ratio is preferably approximately 3:1.

The construction of reactive body is more critical that active float. The reactive body's overall mass must be balanced against buoyancy such that it floats with the still water line approximately at the pivot point and buoyancy to mass ratio of just over unity at all levels of immersion. It must also be sufficiently strong to survive in extreme seas. For large devices the structure is primarily of corrosion protected steel with internal ribs and bracing for strength. Buoyancy is achieved in the upper part of the structure through enclosed air tanks. Parts of these tanks may be filled with air entrapping foam material for higher reliability against possible damage to the external skin and subsequent leaks. Its fully immersed buoyancy-to-weight mass ratio is preferably approximately 1.1:1. Additional floatation tanks are provided in the lower part of the structure for towing the device in horizontal floating position as a raft for ease of deployment. These tanks are selectively flooded during installation at the mooring point to provide appropriate trim. When deployed in operating mode, a significant portion of the device mass consists of entrapped seawater. The centre of buoyancy is designed to be at a specific distance above the centre of mass to ensure vertical stability, but also promote pitching action. This distance is of the order of 0.1 as a ratio of overall immersed length but may be greater or less depending on the other device dimensions. To adjust the rotational inertia, high density ballast mass in the form of steel, concrete or other aggregate materials is entrapped about the center of pitch rotation, which is as close to the bottom of the reactive body as is practical.

Computer Simulated Results

Figure 11:
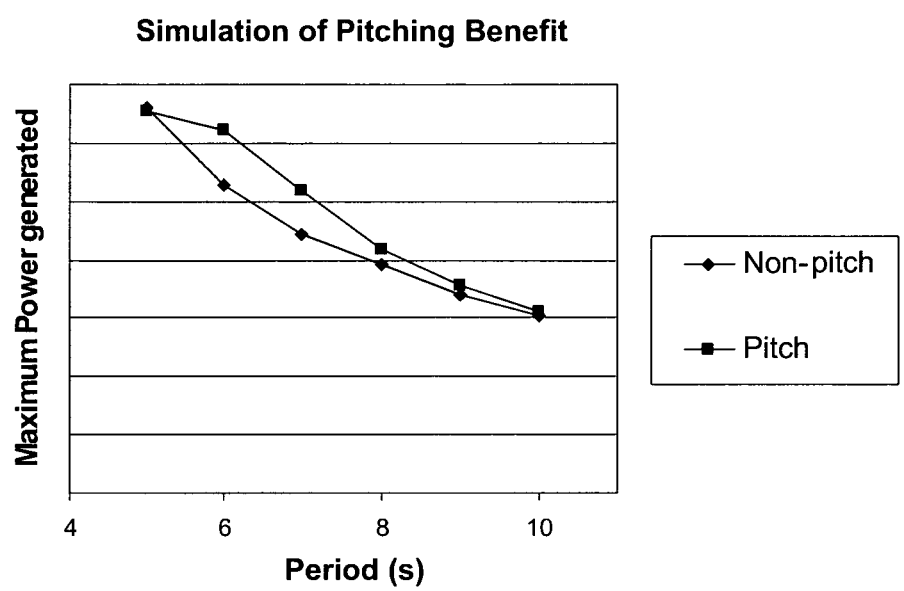
FIG. 11 is a graph depicting the simulated power output generated between a non-pitching point absorber and a wave energy converter of the invention that is arranged to pitch in response to wave motion acting on the reactive body.

Referring to FIG. 11, computer simulations have been conducted to demonstrate the value of capturing pitch energy with the reactive body and surge energy from the active float, in addition to the active float's heave energy. The simulations demonstrate useful increases in power output through pitching of the reactive body. Some of these results are shown in FIG. 11 for the experimental device and 1 m wave height. For a 6 second wave period, 20% additional power was calculated for a reactive body that was allowed to pitch compared with a non-pitching body.

The preferred embodiments of the wave energy converter have been described in the context of devices and systems for capturing and converting the wave energy into useful energy in the form of electrical energy. However, it will be appreciated that the useful energy captured by the wave energy converter may be stored or utilised to drive other systems directly or indirectly. By way of example, the kinetic energy at the pivot of the wave energy converter can be utilised directly in the form of oscillating pivotable movement energy or converted into any other suitable form, such as rotational or linear movement energy, for driving other systems in various applications. For example, the kinetic energy may be utilised to pressurise water or to drive a water pump.

The foregoing description of the invention includes preferred forms thereof. Modifications may be made thereto without departing from the scope of the invention as defined by the accompanying claims.

The invention claimed is:

1. A self-reacting and floating wave energy converter for extracting useful energy from wave motion in a body of liquid comprising:
   an active float that is arranged to float substantially toward or on the surface of the liquid, and being arranged to both heave and surge in response to wave motion acting on the active float;
   an elongate reactive body longitudinally extending between a top end and a bottom end, and having a center of mass located at or toward its bottom end and below its center of buoyancy such that it is arranged to be suspended in a substantially upright vertical position and substantially submerged state into the liquid below the surface, and the reactive body having sufficient surface area and length extending into the liquid from the surface such that it pitches about a center of rotation axis located at or toward its bottom end in response to wave motion acting on the reactive body;
   the active float and reactive body being pivotably coupled at or toward the top end of the reactive body for pivotable movement relative to each other about a single pivot axis in response to heaving and surging of the active float and pitching of the reactive body caused by wave motion in the body of liquid, and wherein the active float and reactive body are pivotably coupled to allow the active float to fully rotate 360° about the single pivot axis; and
   a power output system that is operatively driven by the pivotable movement about the pivot axis to capture the useful energy.

2. A wave energy converter according to claim 1 wherein the active float is arranged to have a low to medium inertia in both the vertical and horizontal directions to enhance heave and surge movements respectively.

3. A wave energy converter according to claim 1 wherein the active float is at least partially hydrofoil-shaped to create lift force to enhance heave and/or surge movements in response to wave motion acting on the active float.

4. A wave energy converter according to claim 1 wherein the active float has a specific gravity of less than one.

5. A wave energy converter according to claim 1 wherein the active float comprises a buoyancy-to-weight ratio of 2:1 to 4:1.

6. A wave energy converter according to claim 1 wherein the active float is a substantially elongate component extending between a first end proximal to the reactive body and a second end distal to the reactive body, the cross-sectional area between the ends being defined peripherally by opposed top and bottom surfaces that are joined by opposed side surfaces, the top surface being arranged to face skyward and the bottom surface being arranged to face toward and into the liquid, and wherein the first and/or second ends of the active float act as a drag surface upon which wave motion acts to create drag force to enhance surge movements of the active float.

7. A wave energy converter according to claim 1 wherein the reactive body is arranged to have a medium to high inertia in the vertical direction to minimize heave movements that are in-phase with the wave motion acting on the reactive body and low to medium rotational inertia about a horizontal axis that is parallel to the pivot axis to enhance pitch movements of the reactive body in response to wave motion acting on the reactive body.

8. A wave energy converter according to claim 1 wherein the reactive body is at least partially hydrofoil-shaped such that substantially vertical wave motion acting on the reactive body creates a horizontal lift force on the reactive body to enhance pitch movements of the reactive body.

9. A wave energy converter according to claim 1 wherein the reactive body is arranged to have a buoyancy-to-weight ratio in the range of 0.9:1 to 1.1:1.

10. A wave energy converter according to claim 1 wherein the reactive body has sufficient width perpendicular to its longitudinal axis along at least a portion of its length extending up from its bottom end so as to create a sufficiently large active surface area upon which wave motion acts to cause pitch movements of the reactive body.

11. A wave energy converter according to claim 1 wherein the reactive body-to-active float weight ratio is in the range of 10:1 to 20:1.

12. A wave energy converter according to claim 1 further comprising one or more slack mooring ropes, each mooring rope being secured at one end at or toward the bottom surface of the body of liquid and at the other end at or toward the bottom end of the reactive body or at the center of rotation of the reactive body.

13. A wave energy converter according to claim 1 wherein the power output system is arranged to utilize the captured useful energy to pressurize or pump water.

14. A wave energy converter according to claim 1 wherein the active float is indirectly pivotally coupled to the reactive body via a sub-frame that is connected at one end to the active float and pivotally coupled at the other end at or toward the top end of the reactive body, and wherein the sub-frame is securely connected at or toward the middle of the active float relative to its length, the active float being pivotally coupled to the sub-frame for pivotal movement relative to the sub-frame such that the active float has two degrees of freedom in that it can pivot relative to the reactive body and pivot relative to the sub-frame to maximize surface contact of the active float with the liquid during wave motion in that the orientation of the active float can conform for maximum contact with the liquid during wave motion.

15. A wave energy converter according to claim 1 wherein the active float is indirectly pivotally coupled to the reactive body via a sub-frame that is connected at one end to the active float and pivotally coupled at the other end at or toward the top end of the reactive body, and wherein the sub-frame is securely and rigidly fixed to the active float such that the active float has one degree of freedom in that it can pivot relative to the reactive body.

16. A wave energy converter according to claim 1 further comprising one or more additional active floats that are pivotally coupled to the reactive body for pivotal movement about the single pivot axis in response to wave motion, the power output system being operatively driven by the relative pivotable movement between the active floats and reactive body to collectively capture the useful energy.

17. A wave energy converter according to claim 1 wherein the body of liquid is the sea or ocean.

18. A wave energy conversion system comprising multiple wave energy converters according to claim 1, each of the converters being linked into a single power output system that is arranged to convert the useful energy into electrical energy.

19. A wave energy converter according to claim 1 wherein the reactive body has an overall specific gravity of approximately one but with a non-uniform mass density distribution profile along its length comprising at least a bottom portion at or toward its bottom end having a mass density substantially greater than the mass density at or toward its upper end to thereby provide the reactive body with a low to medium rotational inertia in pitching about the center of rotation axis.

20. A wave energy converter according to claim 1 wherein the pivot axis is parallel to the center of rotation axis of the reactive body and is non-stationary and un-constrained such that its position oscillates relative to the body of liquid at least in the horizontal direction in response to surging of the active float and pitching of the reactive body.

21. A wave energy converter according to claim 1 wherein the reactive body comprises a main body from which two spaced-apart arms extend, and the active float being pivotally coupled between the arms of the reactive body, the arms being of sufficient length to enable the active float to fully rotate about the pivot axis in response to substantial wave motion.

22. A wave energy converter according to claim 1 wherein the reactive body comprises a main body from which two spaced-apart substantially parallel arms extend, the active float being pivotally coupled between the arms for pivotal movement about the single pivot axis relative to the arms in response to motions of the active float and/or reactive body caused by wave motion in the body of liquid, the arms being of sufficient length to enable the active float to fully rotate 360° about the pivot axis in response to substantial wave motion, and wherein the main body of the reactive body has a plate-like shape and is elongate between upper and lower ends, the lower end of the main body forming the bottom end of the reactive body, and wherein the arms of the reactive body extend from the upper end of the main body in the same longitudinal direction as the elongate main body to form the top end of the reactive body.

23. A wave energy converter according to claim 22 wherein the active float is a substantially elongate component extending between a first end proximal to the reactive body and a second end distal to the reactive body, and wherein the arms of the reactive body extend from the main body a sufficient distance relative to the length of the active float to enable the active float to rotate 360° about the pivot axis between the arms and above the main body in response to wave motion.

24. A wave energy converter according to claim 1 wherein the power output system is arranged to generate electrical energy from the useful energy captured from the pivotable movement between the active float and reactive body about the pivot axis, the power output system comprising an electrical generator having a rotational drive shaft input and the pivotal movement about the pivot axis being coupled to the rotational drive shaft by a coupling system to drive the electrical generator to produce electrical energy.

25. A wave energy converter according to claim 24 wherein the coupling system further comprises a rectifier system that is arranged to convert the oscillatory pivotable movement at the pivot axis into rotational movement in one constant direction, and wherein the coupling system of the power output system is arranged to couple the movement from the rectifier system to the rotational drive shaft of the electrical generator via a gearbox system, the gearbox system being arranged to convert the rotational movement having a higher force and lower speed into a lower force at higher speed for driving the electrical generator.

26. A wave energy converter according to claim 25 wherein the power output system comprises an electrical generator having a rotational drive shaft input and the relative pivotable movement at the pivot axis is coupled to the rotational drive shaft by a coupling system to drive the electrical generator to produce electrical energy, the electrical generator being arranged to drive a load and the power output system comprising a control system that is arranged to actively control the load level in accordance with forward prediction of wave motion in order to optimize the electrical energy generated.

27. A self-reacting and floating wave energy converter for extracting electrical energy from wave motion in a body of liquid comprising:
an active float that is arranged to float substantially toward or on the surface of the liquid, and being arranged to both heave and surge in response to wave motion acting on the active float;
an elongate reactive body longitudinally extending between a top end and a bottom end, and having a center of mass located at or toward its bottom end and below its center of buoyancy such that it is arranged to be suspended in a substantially upright vertical position and substantially submerged state into the liquid below the surface, and the reactive body having sufficient surface area and length extending into the liquid from the surface such that it pitches about a center of rotation axis located at or toward its bottom end in response to wave motion acting on the reactive body;
the active float and reactive body being pivotably coupled at or toward the top end of the reactive body for pivotable movement relative to each other about a single pivot axis in response to heaving and surging of the active float and pitching of the reactive body caused by wave motion in the body of liquid, and wherein the active float and reactive body are pivotably coupled to allow the active float to fully rotate 360° about the single pivot axis; and
a power output system that is operatively driven by the pivotable movement about the pivot axis to generate electrical energy.

\* \* \* \* \*

UNITED STATES PATENT AND TRADEMARK OFFICE
CERTIFICATE OF CORRECTION

PATENT NO.       : 8,686,582 B2
APPLICATION NO.  : 12/515864
DATED            : April 1, 2014
INVENTOR(S)      : Gardiner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Twenty-ninth Day of September, 2015

Michelle K. Lee
*Director of the United States Patent and Trademark Office*